(12) United States Patent
Salvagnini et al.

(10) Patent No.: US 9,807,371 B2
(45) Date of Patent: Oct. 31, 2017

(54) DEPTH PERCEPTIVE TRINOCULAR CAMERA SYSTEM

(71) Applicant: AQUIFI, INC., Palo Alto, CA (US)

(72) Inventors: Pietro Salvagnini, Sunnyvale, CA (US); Michele Stoppa, Sunnyvale, CA (US); Abbas Rafii, Palo Alto, CA (US)

(73) Assignee: Aquifi, Inc., Palo Alto, CA (US)

( * ) Notice: Subject to any disclaimer, the term of this patent is extended or adjusted under 35 U.S.C. 154(b) by 0 days.

(21) Appl. No.: 15/486,005

(22) Filed: Apr. 12, 2017

(65) Prior Publication Data

US 2017/0223340 A1 Aug. 3, 2017

Related U.S. Application Data

(62) Division of application No. 15/147,879, filed on May 5, 2016, now Pat. No. 9,674,504.

(60) Provisional application No. 62/271,212, filed on Dec. 22, 2015.

(51) Int. Cl.
*H04N 13/02* (2006.01)
*G06K 9/62* (2006.01)
*G06K 9/46* (2006.01)

(52) U.S. Cl.
CPC ....... *H04N 13/0246* (2013.01); *G06K 9/4604* (2013.01); *G06K 9/6215* (2013.01); *H04N 13/025* (2013.01); *H04N 13/0253* (2013.01); *H04N 2213/001* (2013.01)

(58) Field of Classification Search
USPC ....................................................... 348/148
See application file for complete search history.

(56) References Cited

U.S. PATENT DOCUMENTS 4,654,872 A * 3/1987 Hisano .................. G06K 9/209
250/558
5,249,035 A * 9/1993 Yamanaka ........... G01B 11/245
348/135

(Continued)

OTHER PUBLICATIONS

Hartley, Richard and Zisserman, Andrew, "Multiple View Geometry in Computer Vision", Second Edition, Cambridge University Press, Cambridge, UK, 2003, ISBN 0521 54051 8, pp. 363-407 (48 pages).

(Continued)

*Primary Examiner* — Leron Beck
(74) *Attorney, Agent, or Firm* — Lewis Roca Rothgerber Christie LLP

(57) ABSTRACT

A method for detecting decalibration of a depth camera system including a first, second, and third cameras having overlapping fields of view in a direction includes: detecting a feature in a first image captured by the first camera; detecting the feature in a second image captured by the second camera; detecting the feature in a third image captured by the third camera, the third camera being non-collinear with the first and second cameras; identifying a first conjugate epipolar line in the second image in accordance with a detected location of the feature in the first image and calibration parameters; identifying a second conjugate epipolar line in the second image in accordance with a detected location of the feature in the third image and the calibration parameters; and calculating a difference between a detected location of the feature in the second image and the first and second conjugate epipolar lines.

15 Claims, 18 Drawing Sheets

(56) References Cited

U.S. PATENT DOCUMENTS

| | | | | |
|---|---|---|---|---|
| 8,073,196 B2* | 12/2011 | Yuan | ........................ | G06K 9/32 |
| | | | | 348/169 |
| 2003/0156751 A1* | 8/2003 | Lee | ......................... | G06K 9/03 |
| | | | | 382/154 |
| 2004/0233290 A1* | 11/2004 | Ohashi | ................... | B25J 19/023 |
| | | | | 348/187 |
| 2007/0033999 A1* | 2/2007 | Bothe | ....................... | G06T 7/80 |
| | | | | 73/117.01 |
| 2008/0205748 A1* | 8/2008 | Lee | ....................... | G01B 11/25 |
| | | | | 382/154 |
| 2010/0080419 A1* | 4/2010 | Okugi | ................ | G06K 9/00791 |
| | | | | 382/104 |
| 2013/0258067 A1* | 10/2013 | Zhang | ................. | H04N 13/0242 |
| | | | | 348/48 |
| 2014/0125772 A1* | 5/2014 | Myokan | ............. | H04N 13/0246 |
| | | | | 348/47 |
| 2015/0054918 A1* | 2/2015 | Lee | .................... | H04N 13/0221 |
| | | | | 348/46 |
| 2016/0127713 A1 | 5/2016 | Hazeghi | | |
| 2016/0127714 A1 | 5/2016 | Hazeghi et al. | | |

OTHER PUBLICATIONS

Szeliski, Richard, "Computer Vision, Algorithms and Applications," Springer London Dordrecht Heidelberg New York, 2011, ISBN 978-1-84882-934-3, pp. 467-503 (39 pages).

\* cited by examiner

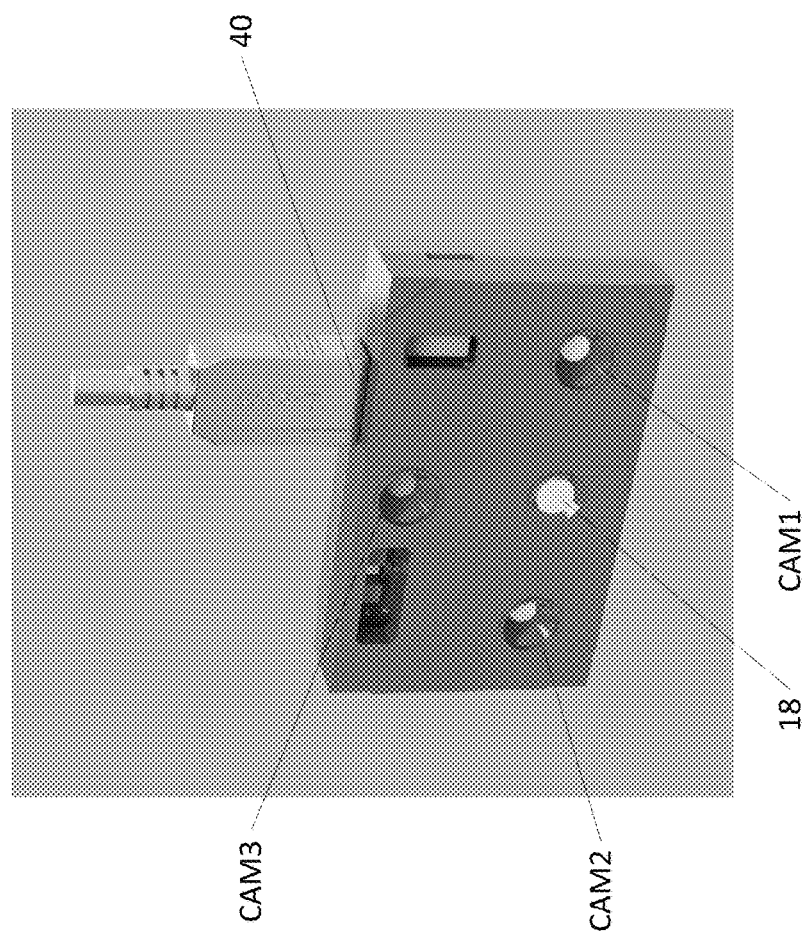

DEPTH PERCEPTIVE TRINOCULAR CAMERA SYSTEM

CROSS-REFERENCE TO RELATED APPLICATION(S)

This application is a divisional of U.S. patent application Ser. No. 15/147,879, filed on May 5, 2016, which claims the benefit of U.S. Provisional Patent Application No. 62/271,212, "Depth Perceptive Trinocular Camera System," filed in the United States Patent and Trademark Office on Dec. 22, 2015, the entire disclosures of which are incorporated by reference herein.

FIELD

Aspects of embodiments of the present invention are directed to depth camera systems. In more detail, some aspects of embodiments of the present invention are directed to depth camera systems that include multiple cameras and systems and methods for detecting decalibration conditions.

BACKGROUND

The need for producing good quality high resolution depth data is growing on variety of electronic devices including mobile, home entertainment, gaming, robots, drones, augmented or virtual reality (AR/VR) systems, cars, security, etc. The depth data is used in many imaging and detection applications in consumer and industrial markets.

Depth perceptive camera systems can be used to capture a scene and estimate the depth (or "z-distance") of each pixel in a scene, thereby generating a "depth map." Generally depth camera systems (or "depth cameras") can be classified into passive depth cameras and active depth cameras.

Active depth cameras generally include an active illumination component or a projector which emits light onto a scene. Broadly, these include: "time-of-flight" active depth cameras, which emit diffuse modulated illumination onto the scene; and "structured light" active depth cameras, which emit an illumination pattern in order to project a pattern onto the scene. The pattern may be used in the determination of the disparities for general cases (e.g., by providing additional texture to low texture objects or by optimizing the determination of disparities), and also allows operation in conditions with insufficient ambient lighting (e.g., in dark environments). Passive depth camera systems lack such active illumination components.

Some depth camera systems utilize stereo vision techniques in which depth data is computed based on the disparity between matching features found in the images captured by multiple cameras. Using an image acquisition system that includes two or more cameras can improve robustness against deviations in the projection pattern and can also enable operation in situations with bright ambient lighting (e.g., in which a pattern projected by the active illumination component cannot be detected over the ambient light).

Some depth camera systems utilize stereo vision techniques in which depth data is computed based on the disparity between matching pattern features found in the images captured by one camera and a coded pattern projected in a so called structured light method. In the continuing text, the subject is described in the context of a more general multi-camera stereo system wherein the structured light method may be considered as a system sub-class.

When computing depth information, the depth camera system uses known calibration parameters, as discussed in more detail below. The calibration parameters illustrate that the depth calculations are sensitive to the distance between the cameras and their orientation with respect to one another (e.g., the angles between the optical axes or the optical planes of the cameras).

SUMMARY

Aspects of embodiments of the present invention are directed to depth camera systems including multiple cameras. Aspects of embodiments of the present invention are also directed to systems and methods for automatically detecting a decalibration state of the multiple cameras.

According to one embodiment of the present invention, a method for detecting decalibration of a depth or depth and color camera system including a first camera, a second camera, and a third camera, the first, second, and third cameras having substantially overlapping fields of view in a direction, includes: detecting a feature in a first image captured by the first camera; detecting the feature in a second image captured by the second camera; detecting the feature in a third image captured by the third camera, the third camera being non-collinear with the first and second cameras; identifying a first conjugate epipolar line in the second image in accordance with a detected location of the feature in the first image and a plurality of calibration parameters; identifying a second conjugate epipolar line in the second image in accordance with a detected location of the feature in the third image and the plurality of calibration parameters; calculating a difference between a detected location of the feature in the second image and the first and second conjugate epipolar lines; and outputting an indication that the depth camera system is decalibrated in response to the difference exceeding a threshold.

The difference may include a first difference and a second difference, and wherein the calculating the difference may include: calculating a first difference between the detected location of the feature in the second image and the first conjugate epipolar line; and calculating a second difference between the detected location of the feature in the second image and the second conjugate epipolar line.

The method may further include calculating a location of an intersection of the first conjugate epipolar line and the second conjugate epipolar line, and the calculating the difference may include calculating a distance between the detected location of the feature in the second image and the location of the intersection.

The first camera and the second camera may be configured to capture invisible light, and wherein the third camera may be configured to capture visible light.

The method may further include emitting, by a projection device located between the first camera and the second camera, a textured pattern of invisible light in the direction of the overlapping fields of view.

According to one embodiment of the present invention, a depth perceptive camera system includes: a first camera configured to capture infrared images; a second camera; a third camera arranged non-collinearly with the first and second cameras, the first, second, and third cameras having substantially overlapping fields of view in a direction, and at least one of the second and third cameras being configured to capture visible light images, the third camera being equidistant from the first and second cameras, the third camera having a higher resolution than a resolution of the first camera by a resolution factor r; and an image signal processor configured to receive images from the first camera, the second camera, and the third camera, the image signal processor being configured to detect a decalibration of the first, second, and third cameras, wherein a first baseline extends between the second camera and the first camera, wherein a second baseline extends between the second camera and the third camera, and wherein an angle α formed between the first baseline and the second baseline is approximately $\alpha_{optimal}$, where $$\alpha_{optimal} = \mathrm{argmax}_\alpha \left\{ \left( \frac{2 \times \sin(\alpha) + r \times \sin(2\alpha)}{3} \right) - \left( \frac{\tan(\alpha)}{2} \right) \right\}.$$

The resolution factor r may be 1.0, and the angle α may be in the range of 26.0 degrees to 44.3 degrees. The angle α may be in the range of 28.9 degrees to 41.9 degrees. The angle α may be about 35.6 degrees.

The resolution factor r may be 2.0, and the angle α may be in the range of 21.4 degrees to 53.4 degrees.

The first camera and the second camera may be configured to capture invisible light, and the third camera may be configured to capture visible light.

The depth perceptive camera system may further include a projection device located between the first camera and the second camera, the projection device being configured to emit a textured pattern of invisible light in the direction of the overlapping fields of view.

The image signal processor may be configured to detect the decalibration of the first, second, and third cameras by: detecting a feature in a first image captured by the first camera; detecting the feature in a second image captured by the second camera; detecting the feature in a third image captured by the third camera, the third camera being non-collinear with the first and second cameras; identifying a first conjugate epipolar line in the second image in accordance with a detected location of the feature in the first image and a plurality of calibration parameters; identifying a second conjugate epipolar line in the second image in accordance with a detected location of the feature in the third image and the plurality of calibration parameters; calculating a difference between a detected location of the feature in the second image and the first and second conjugate epipolar lines; and outputting an indication that the depth camera system is decalibrated in response to the difference exceeding a threshold.

The difference may include a first difference and a second difference, and wherein the image signal processor may be configured to calculate the difference by: calculating a first difference between the detected location of the feature in the second image and the first conjugate epipolar line; and calculating a second difference between the detected location of the feature in the second image and the second conjugate epipolar line.

The image signal processor may be further configured to: calculate a location of an intersection of the first conjugate epipolar line and the second conjugate epipolar line; and calculate the difference by calculating a distance between the detected location of the feature in the second image and the location of the intersection.

According to one embodiment of the present invention, a mobile device includes: a display; a first camera configured to capture infrared images, the first camera being adjacent a first edge of the display; a second camera adjacent the first edge of the display; a third camera arranged non-collinearly with the first and second cameras and adjacent a second edge of the display, the first, second, and third cameras having substantially overlapping fields of view, and at least one of the second and third cameras being configured to capture visible light images, the third camera being equidistant from the first and second cameras, the third camera having a higher resolution than a resolution of the first camera by a resolution factor r; and an image signal processor configured to control the display and to receive images from the first camera, the second camera, and the third camera, the image signal processor being configured to detect a decalibration of the first, second, and third cameras, wherein a first baseline extends between the second camera and the first camera, wherein a second baseline extends between the second camera and the third camera, and wherein an angle α formed between the first baseline and the second baseline is approximately $\alpha_{optimal}$, where $$\alpha_{optimal} = \mathrm{argmax}_\alpha \left\{ \left( \frac{2 \times \sin(\alpha) + r \times \sin(2\alpha)}{3} \right) - \left( \frac{\tan(\alpha)}{2} \right) \right\}..$$

The resolution factor r may be 1.0, and the angle α may be in the range of 26.0 degrees to 44.3 degrees. The angle α may be in the range of 28.9 degrees to 41.9 degrees. The resolution factor r may be 2.0, and the angle α may be in the range of 21.4 degrees to 53.4 degrees.

The image signal processor may be configured to detect the decalibration of the first, second, and third cameras by: detecting a feature in a first image captured by the first camera; detecting the feature in a second image captured by the second camera; detecting the feature in a third image captured by the third camera, the third camera being non-collinear with the first and second cameras; identifying a first conjugate epipolar line in the second image in accordance with a detected location of the feature in the first image and a plurality of calibration parameters; identifying a second conjugate epipolar line in the second image in accordance with a detected location of the feature in the third image and the plurality of calibration parameters; calculating a difference between a detected location of the feature in the second image and the first and second conjugate epipolar lines; and outputting an indication that the first, second, and third cameras are decalibrated in response to the difference exceeding a threshold.

BRIEF DESCRIPTION OF THE DRAWINGS

The accompanying drawings, together with the specification, illustrate exemplary embodiments of the present invention, and, together with the description, serve to explain the principles of the present invention.

FIG. 2B is a perspective view of a depth perceptive camera system including three cameras according to one embodiment of the present invention.

DETAILED DESCRIPTION

Figure 1:
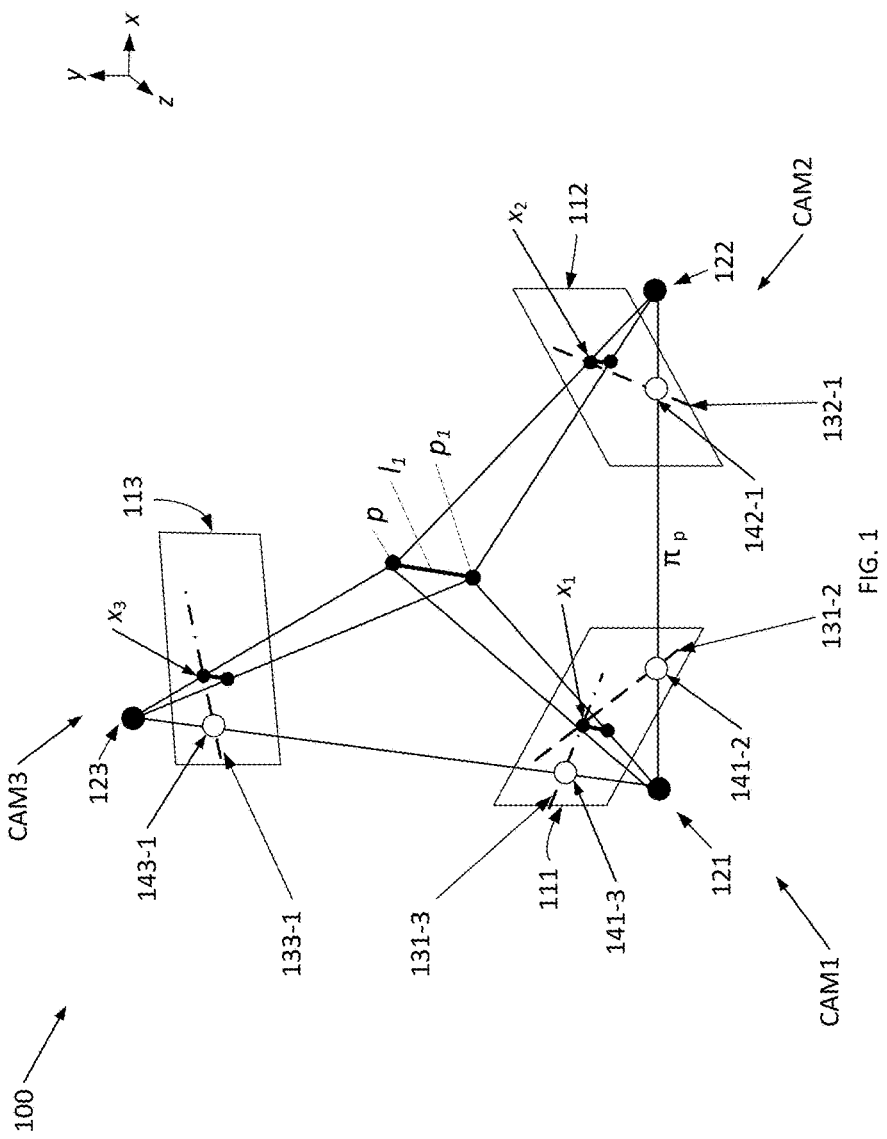
FIG. 1 is a schematic illustration of a depth perceptive camera system according to one embodiment imaging a point in space.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Generally speaking, a stereoscopic depth camera system may include two cameras that are spaced apart from each other and rigidly mounted to a shared structure such as a rigid frame. To detect the depth of a feature in a scene imaged by the two cameras, the depth camera system determines the pixel location of the feature in each of the images captured by the cameras. The distance between the features in the two images is referred to as the disparity, which is inversely related to the distance or depth of the object. (This is the effect when comparing how much an object "shifts" when viewing the object with one eye at a time—the size of the shift depends on how far the object is from the viewer's eyes, where closer objects make a larger shift and farther objects make a smaller shift and objects in the distance may have little to no detectable shift.)

In the following discussion, the image acquisition system of the depth camera system may be referred to as having at least two cameras, which may be referred to as a "master" camera and one or more "slave" cameras. Generally speaking, the estimated depth or disparity maps computed from the point of view of the master camera, but any of the cameras may be used as the master camera. As used herein, terms such as master/slave, left/right, above/below, first/second, and CAM1/CAM2/CAM3 are used interchangeably unless noted. In other words any one of the cameras may be master or a slave camera, and considerations for a camera on a left side with respect to a camera on its right may also apply, by symmetry, in the other direction. In addition, the considerations presented below may be valid for various numbers of cameras.

The size of the disparity between the master and slave cameras depends on physical characteristics of the depth camera system, such as the pixel resolution of cameras, distance between the cameras and the fields of view of the cameras. Therefore, to generate accurate depth measurements, the depth camera system (or depth perceptive depth camera system) is calibrated based on these physical characteristics.

In some depth camera systems, the cameras may be arranged such that horizontal rows of the pixels of the image sensors of the cameras are substantially parallel. Image rectification techniques can be used to accommodate distortions to the images due to the shapes of the lenses of the cameras and variations of the orientations of the cameras.

In addition, identifying matching features in a depth camera system with multiple cameras having overlapping fields of view can be accelerated by narrowing the search to regions around epipolar lines. In more detail, a pixel in an image from a first camera can be back projected onto an epipolar line segment in an image from a second camera, where the epipolar line segment extends between the projection of the original viewing ray. A feature detected in one image can therefore be found along the epipolar line corresponding to the projection of the pixel onto the second image, thereby constraining the search for the matching feature to a substantially linear search, rather than a search across the entire second image. These techniques are described in more detail, for example, in R. Szeliski. "Computer Vision: Algorithms and Applications", Springer, 2010, p. 467 et seq. See, e.g., FIG. 1, which illustrates a three camera or trinocular camera system, in which epipolar lines 131-2, 131-3, 132-1, and 133-1 are shown by the dotted lines.

FIG. 1 is a schematic illustration of a depth perceptive camera system according to one embodiment imaging a point in space. Referring to FIG. 1, a first camera CAM1, a second camera CAM2, and a third camera CAM3 image a point p in three dimensional space (3D space or x-y-z space). Each of the cameras has an image plane 111, 112, 113 (e.g., corresponding to an image sensor) and a center point 121, 122, 123. Point p is projected onto the image planes 111, 112, 113 at locations $x_1$, $x_2$, and $x_3$, respectively. Point of intersection of a hypothetical line between the centers of the cameras and their respective image planes are labeled with white circles. For example, the line between the centers 121 and 122 of CAM1 and CAM2 intersect with their respective image planes 111 and 112 at 141-2 and 142-1. Similarly, the line between the centers 121 and 123 of CAM1 and CAM3 intersect with their respective image planes 111 and 113 at 141-3 and 143-1.

When the cameras are calibrated, as discussed in more detail below, location $x_1$ on image plane 111 can be projected onto a conjugate epipolar line 132-1 for a 3D point p on image plane 112 and location $x_2$ is located on conjugate epipolar line 132-1. Similarly, location $x_2$ can be projected onto a conjugate epipolar line 131-2 for point p on image plane 111 and location $x_1$ is on the conjugate epipolar line 131-2. Similarly, location $x_1$ on image plane 111 can be projected onto a conjugate epipolar line 133-1 for point p on image plane 113 and location $x_3$ is located on conjugate epipolar line 133-1. Location $x_3$ can be projected onto conjugate epipolar line 131-3 for point p on image plane 111 and location $x_1$ is on the conjugate epipolar line 131-2. Therefore, a conjugate epipolar line can be identified for each location in each of the images based on known calibration parameters, as discussed in more detail below.

As such, when properly calibrated, the projection of point p onto the image plane 111 of CAM1 is located at the intersection of epipolar lines 131-2 and 131-3.

FIG. 1 also illustrates that other parts of the 3D scene containing p also have images on the image planes 111, 112, and 113, noting points $p_1$ and segment $l_1$ joining p to $p_1$.

Camera calibration information provides the necessary information to rectify input images so that epipolar lines of the equivalent camera system are aligned with the scanlines of the rectified image. In such a case, a 3D point in the scene projects onto the same scanline index of in the rectified master and slave images. Let $x_1$ and $x_2$ be the coordinates on the scanline of the image of the same 3D point p in the master and slave equivalent cameras, respectively, where in each camera these coordinates refer to an axis system centered at the principal point (the intersection of the optical axis with the focal plane) and with horizontal axis parallel to the scanlines of the rectified image. As described above, the difference $x_1-x_2$ is called disparity and denoted by d; it is inversely proportional to the orthogonal distance of the 3D point with respect to the rectified cameras (that is, the length of the orthogonal projection of the point onto the optical axis of either camera).

In some embodiments of the present invention, the depth camera system includes two invisible light cameras and a visible light or color camera, where the system is configured to compute a depth estimate for each color pixel of the color camera. In these embodiments, capturing both invisible light and visible light enables a depth and color perceptive camera system (sometimes referred to as RGB-D or RGB-Z systems, where RGB stands for "red green blue" colors, D or Z stands for "depth"). In some embodiments, the invisible light cameras may be infrared cameras. In other words, a typical usage is to obtain depth information from the perspective of the color camera by "warping" the depth information from the perspective of the depth cameras to the perspective of the color camera. To enable warping, the color camera is also calibrated with respect to the depth cameras. In addition, a color camera generally has more pixels (or higher resolution) than the invisible light cameras, and can provide additional color clues to the depth calculation algorithm to improve the overall depth calculation accuracy of the system. Furthermore, even if the color clues and higher resolution of the color camera are used, the third camera can contribute to providing accurate depth calculations, such as by providing depth of portions of the scene that may be occluded when only two cameras are used.

As discussed above, a depth camera system using multiple cameras is typically calibrated in the context of a controlled environment in order to account for the physical locations and orientation of the cameras with respect to one another. For example, the multiple cameras mounted onto a rigid frame may be arranged at various orientations with respect to one another and at various distances from one another. Imprecision and variations during the mounting process may cause the final locations of the cameras to vary from one depth camera system to another. As such, a calibration process may be used to generate calibration parameters in order to compute accurate depth measurements based on the actual locations of the cameras, where the calibration process includes defining a plurality of conjugate epipolar lines corresponding to pixels in each of the image planes. The calibration process typically relies on capturing one or more images of a calibration target (that appears like a checker board) with known geometry and solving the projection equations of a set of 3D points and their (sub) pixel locations in the image planes. In some systems, this calibration is performed at the time of manufacturing (e.g., after the camera system has been assembled) and the calibration settings may be programmed into the device prior to delivery to an end user.

In ideal scenarios, calibration at the time of manufacturing may be sufficient in circumstances where the physical relationship between the cameras remains unchanged. For example, depth camera systems for video arcade machines may be rigidly mounted to and protected by an arcade cabinet. As another example, a depth camera system of a home video game console may be deployed adjacent a television screen and may generally rest, substantially undisturbed, throughout the lifetime of the system.

In practice, in many circumstances, the physical relationship between the cameras may undergo significant changes over the lifetime of the device. Video game arcade machines are frequently abused by players, and components of home video game consoles may be knocked over and/or stepped on. As another example, mobile devices or mobile computing devices such as smartphones, tablets, laptops, and other portable computing devices generally include integrated displays and are frequently dropped, bent, subjected to significant temperature changes, and mishandled in various other ways, and therefore a depth camera system incorporated into a mobile device can become decalibrated, even when the cameras are mounted to a rigid frame.

Figure 4:
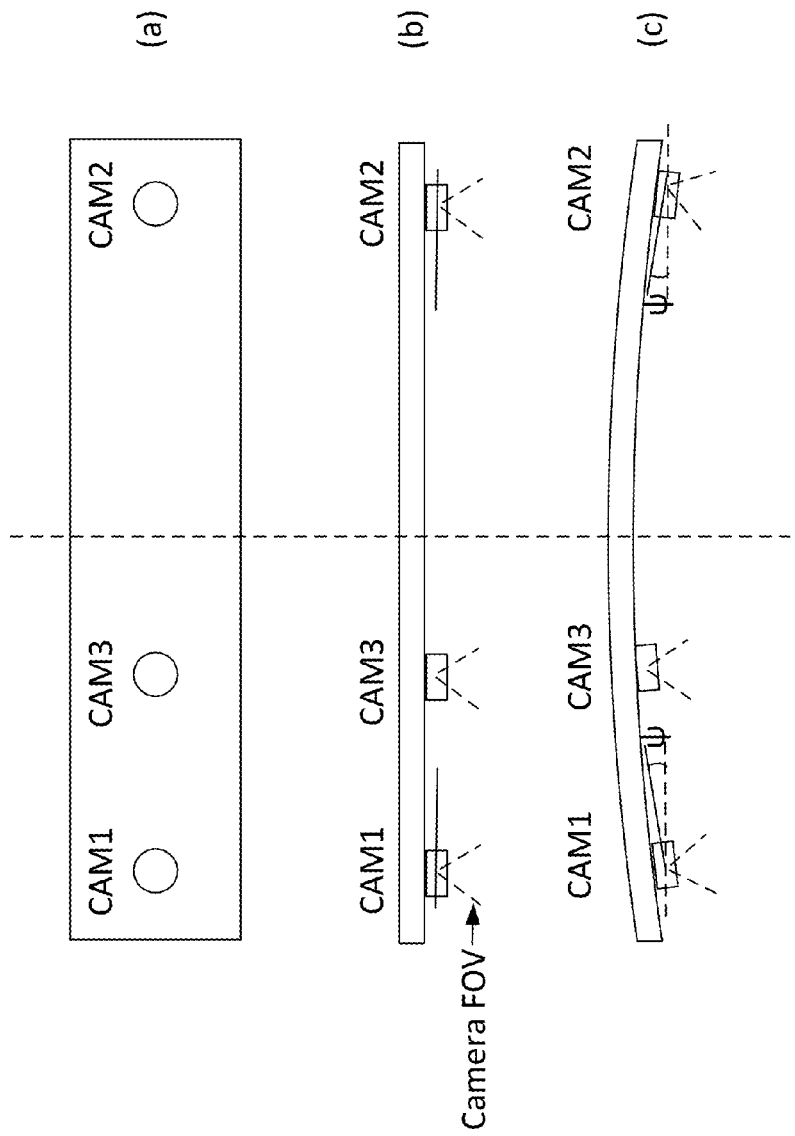
FIG. 4 illustrates a rotational decalibration of a trinocular system in which the three cameras are collinear.

As a result, the multiple cameras of a depth camera system installed in a mobile device or a standalone, portable depth camera system may not necessarily maintain the same physical relationship throughout the lifetime of the depth camera system. For example, a deformation, such as a permanent bend in the mobile device, may cause a change in the orientations of the cameras, as illustrated in FIG. 4. This results in a decalibration of the camera system such that the depth camera system no longer calculates accurate depth information. For example, the deformed depth camera system shown in FIG. 4(c) may calculate objects as being farther away than they actually are. This decalibration and loss of accuracy may result in reduced or impaired functionality when the decalibrated depth camera system is used to detect user gestural input and may also result in significant errors when used as a tool to measure the sizes and locations of objects in the world. Thus it is important that the decalibration condition becomes detectable, preferably without user's explicit verification.

The process of recalibration can be difficult, both because the product must be taken out of service during recalibration, and because recalibration may require significant computational processing resources. Thus it is important that the recalibration process is invoked if the camera is truly out of calibration.

In view of these issues, embodiments of the present invention are directed to a depth camera system having multiple cameras that are arranged to detect decalibration situations while maintaining high performance in the generation of depth maps. One embodiment of the present invention is directed to a three camera (or trinocular) camera system having these properties.

Figure 2A:
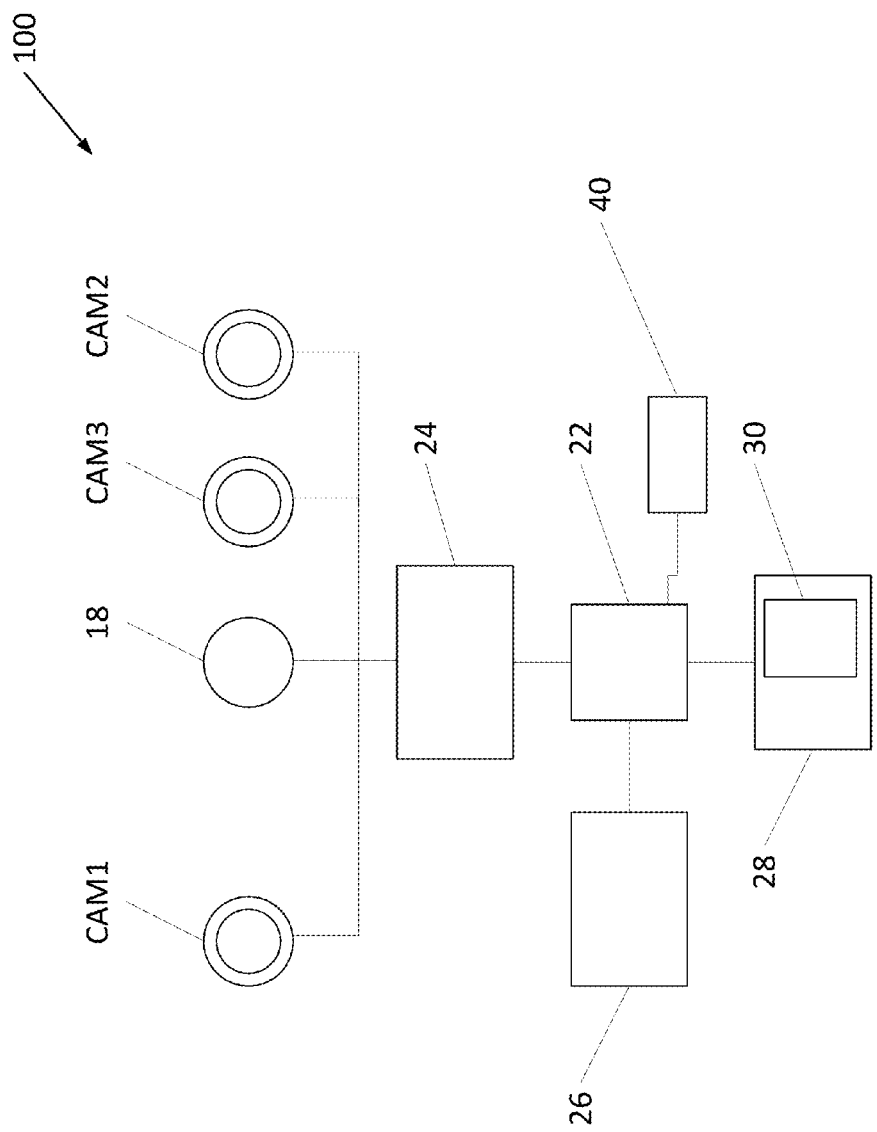
FIG. 2A is a block diagram illustrating a depth perceptive camera system according to one embodiment of the present invention.

The depth camera system may be incorporated into an image processing system. Image processing systems in accordance with many embodiments of the invention can be implemented using a variety of software configurable computing devices including (but not limited to) personal computers, tablet computers, smartphones, embedded devices, augmented reality (AR) and virtual reality (VR) equipment (e.g., headgear), and consumer electronics devices such as (but not limited to) televisions, disc players, set top boxes, and game consoles. An image processing system in accordance with an embodiment of the invention is illustrated in FIG. 2A. The image processing system 100 includes a processor 22 that is configured to communicate with an image signal processor (or camera interface) 24 and a display interface 26. The image processing system also includes memory 28, which can take the form of one or more different types of storage including semiconductor and/or disk based storage. In the illustrated embodiment, the processor 22 is configured using an operating system 30 stored in the memory 28.

In many embodiments, the processor receives frames of video data via the image signal processor 24 from at least one camera (e.g., cameras CAM1, CAM2, and CAM3). The camera interface can be any of a variety of interfaces appropriate to the requirements of a specific application including (but not limited to) the USB 2.0 or 3.0 interface standards specified by USB-IF, Inc. of Beaverton, Oreg., and the MIPI-CSI2 interface specified by the MIPI Alliance. In a number of embodiments, the received frames of video data include image data represented using the RGB color model represented as intensity values in three color channels. In several embodiments, the received frames of video data include monochrome image data represented using intensity values in a single color channel. In several embodiments, the image data represents visible light. In other embodiments, the image data represents intensity of light in non-visible (or invisible) portions of the spectrum including (but not limited to) the infrared, near-infrared, and ultraviolet portions of the spectrum. In certain embodiments, the image data can be generated based upon electrical signals derived from other sources including but not limited to ultrasound signals. In several embodiments, the received frames of video data are compressed using the Motion JPEG video format (ISO/IEC JTC1/SC29/WG10) specified by the Joint Photographic Experts Group. In a number of embodiments, the frames of video data are encoded using a block based video encoding scheme such as (but not limited to) the H.264/MPEG-4 Part 10 (Advanced Video Coding) standard jointly developed by the ITU-T Video Coding Experts Group (VCEG) together with the ISO/IEC JTC1 Motion Picture Experts Group. In certain embodiments, the image processing system receives RAW image data.

In some embodiments of the present invention, the depth perceptive camera system includes an interface 40 to allow the system to be coupled to a host hardware device such as a computer. The interface 40 may be, for example, a USB 2.0 or USB 3.0 connection.

Some embodiments of the present invention include an active illumination projector 18 configured to emit light in a spectrum that is detectable by one or more of the cameras. For example, in embodiments of the present invention that include one or more invisible light cameras (e.g., two infrared cameras CAM1 and CAM2), the active illumination projector may be configured to emit a textured pattern of infrared light. In some embodiments, the active illumination projector 18 may be located between (e.g., collinear with) cameras that are configured to detect light corresponding to the spectrum emitted by the projector. For example, in embodiments where the active illumination projector is configured to emit infrared light, the projector may be located between two infrared cameras. The active illumination projector 18 may be implemented using light source such as a light emitting diode (LED) or a laser and the light source may be coupled to an optical system configured to generate a pattern. Examples of such systems are described, for example in U.S. patent application Ser. No. 14/743,738 "Systems and Methods for Reducing Z-Thickness and Zero-Order Effects in Depth Cameras" and U.S. patent application Ser. No. 14/743,742 "3D Depth Sensor and Projection System and Methods of Operating Thereof," both filed in the United States Patent and Trademark Office on Jun. 18, 2015, the entire disclosures of which are incorporated herein by reference.

In various embodiments, the cameras may include standard digital image sensors such as complementary metal oxide semiconductor (CMOS) or charge-coupled device (CCD) digital image sensors. The each of the cameras also generally includes an optical system, such as one or more lenses, configured to focus incoming light onto the image sensor of the individual camera. In some embodiments, the sensors of the infrared camera and the color camera may be substantially similar, but may differ merely in the presence or absence of a filter (e.g., a color filter such as red, green, and blue filters arranged in a Bayer pattern or a band-pass or low-pass filter corresponding to the infrared range). In some embodiments, the infrared camera may have a sensor with larger sized pixels than the color camera and, in these embodiments, the infrared camera may have a lower resolution than the color camera. However, embodiments of the present invention are not limited thereto.

In some embodiments, the depth perceptive trinocular camera system 100 includes a display interface 26 configured to drive a display device that can be integrated within the image processing system and/or external to the image processing system. In a number of embodiments, the HDMI High Definition Multimedia Interface specified by HDMI Licensing, LLC of Sunnyvale, Calif. is utilized to interface with the display device. In other embodiments, any of a variety of display interfaces appropriate to the requirements of a specific application can be utilized. In some embodiments of the present invention that are integrated with a display, the cameras may be arranged in a bezel region surrounding the display, where at least one of the cameras is located adjacent a different edge of the display than at least one of the other cameras (e.g., two cameras may be located along a first edge of the display and the third camera may be located along a second edge of the display opposite and parallel to the first edge of the display).

FIG. 2B is a perspective view of a depth perceptive camera system including three cameras according to one embodiment of the present invention. In the embodiment shown in FIG. 2B, the cameras CAM1, CAM2, and CAM3 are arranged to face in substantially the same direction and have overlapping fields of view. In addition, the active illumination component 18 faces in the same direction as the cameras CAM1, CAM2, and CAM3 and is located collinear with, and between, CAM1 and CAM2. An external interface 40 may be used to connect the depth perceptive camera system to a host device.

Depth Detection and Calibration

Aspects of embodiments of the present invention will be described below in the context of two infrared cameras and one color camera. However, embodiments of the present invention are not limited thereto. For example, embodiments of the present invention may use different combinations of cameras, such as: two color cameras with one infrared camera; three infrared cameras; or three color cameras. A three camera layout will be referred to herein as a "trinocular" layout, but embodiments of the present invention are not limited thereto and, some embodiments may include more than three cameras.

One factor in designing a layout of the cameras of a depth camera system having multiple cameras is the designed precision of the resulting system. In theory, a larger the distance between the cameras results in a higher precision depth calculation. As discussed above, the depth calculation for a point in 3D space using a pair of calibrated stereo camera is performed by measuring the so called pixel disparity between the image of the point in the one (first) camera and the image of the same point in the other (second) camera, and then applying a triangulation method. For a distant object (e.g., having large depth), the disparity becomes zero. The disparity increases as the point approaches the camera (to locations having small depth).

To enable the depth calculation for all camera-visible points in a scene, correspondences between the imaged points in 3D space in the cameras are determined. When the cameras are calibrated to conform to a "pin-hole camera" model, the corresponding points in the cameras substantially lie on so called conjugated (related) epipolar lines (see FIG. 1) in respective image planes. In FIG. 1, see for instance, the conjugated epipolar lines for camera CAM1 and camera CAM2 for a point p in 3D space.

When the cameras arranged along a line parallel to the pixels of the rows of the image sensors (e.g., CAM1 and CAM2 in FIG. 2), after rectifying the images from the cameras, the epipolar lines of images from are parallel to rows of pixels. This simplifies the search for matching features to a row-wise search (with a few pixels above and below due to slight calibration errors). When the cameras are not arranged in this way, the epipolar lines will still exist, but will not necessarily be parallel to the corresponding sensor rows. For example, if a third camera CAM 3 is located non-collinearly with CAM1 and CAM2, epipolar lines between CAM1 and CAM3 as well as the epipolar lines between CAM1 and CAM3 may lie along diagonals across the images. This will be discussed in more detail below with reference to FIGS. 7 and 8.

Generally speaking, there are at least two competing factors when designing a camera layout that is capable of providing high quality depth data while being able to detect decalibration. One consideration is the reduction or minimization of occlusion (e.g., portions of the scene that are visible to at least one camera but not visible to at least one other camera). The other consideration is the ability to detect a wide range of decalibration possibilities that are expected to be encountered in practice.

Figure 3:
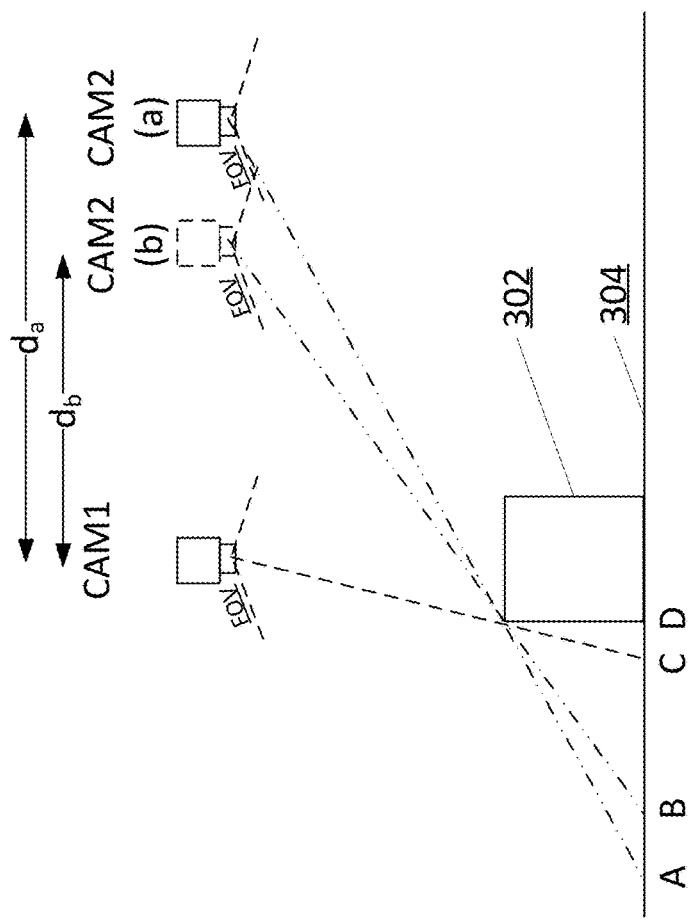
FIG. 3 illustrates occlusion between two cameras.

Generally, occlusion is reduced when the cameras are placed closer together. FIG. 3 illustrates occlusion between two cameras: CAM1 and CAM2. As shown in FIG. 3, object 302 is located between the cameras (CAM 1 and CAM2) and a background 304. Portion C-D of background 304 is not visible from the perspective of CAM1. If CAM2 is located at position (a), at a distance $d_a$ from CAM1, then portion A-D of background 304 is blocked by object 302. As such, portion A-C is visible to CAM1, but not visible to CAM2. On the other hand, if CAM2 is located at position (b) closer to CAM1 (at a distance $d_b$ from CAM1, where $d_b<d_a$), then a smaller portion B-D of the background 304 is blocked by object 302. As a result, the amount of occlusion is reduced by the size of portion A-B. In other words, while there is still a portion B-C that is visible to CAM1 and not visible to CAM2, the portion B-C is smaller than portion A-C.

Occlusion can be a problem when identifying corresponding features in images. For example, a feature detected in a portion of the scene that is partially occluded will be detected in one image but not another, thereby making it impossible to determine the depth of the feature in the scene. As another example, texture information such as the color of features of the scene may also be unavailable for portions of the scene that the color camera is unable to image.

In a depth camera system with three or more cameras, the cameras may not necessarily be collinear. When the cameras are collinear, occlusion is eliminated or minimized along a direction perpendicular to the line formed by the cameras. On the other hand, occlusion will increase as a camera is displaced from the line. In addition, in embodiments of the present invention that include a color camera, placing the color camera closer to the master camera (e.g., the camera corresponding to the perspective that the resulting depth image is computed from) can also reduce the effects of occlusion.

On the other hand, placing one of the cameras "off axis" improves the ability of the system to detect various types of decalibration situations, as discussed in more detail below. The decalibration or out of calibration condition can affect the depth computation and the computation of warping (or fusion of) color information with depth information. In particular, if the trinocular layout goes out of calibration, the superimposition of depth and color pixels will no longer be correct. If the superimposition is incorrect, either the depth of the scene imaged by a pixel is incorrect, or the color of the same scene may be incorrect. This condition becomes rather acute at the edges of object where even a few pixel errors can cause large errors.

FIG. 4 illustrates a rotational decalibration of a trinocular system in which the three cameras are collinear. FIG. 4(a) is a front view of the trinocular camera system. FIG. 4(b) is a top view of the trinocular camera system before decalibration. FIG. 4(c) is a top view of a depth camera system after the camera system has been deformed. As shown in FIG. 4(c), the rotational deformation (e.g., the bending of the support or frame that the cameras are mounted on) has caused CAM1 and CAM2 have rotated by $\psi$ degrees with respect to the original axis of the camera and by $2\psi$ degrees with respect to each other. This kind of deformation can happen due to mechanical reasons, such as temperature, pressure, shock, or other camera handling issues. Even a very small decalibration (rotational deformation) angle can produce gross errors in disparity determination and thus depth calculation. In addition, in the case of a collinear trinocular camera system (e.g. the layout in FIG. 2A) these errors are difficult to detect as described in more detail below.

Detecting Out-of-Calibration or Decalibration

Figure 5A:
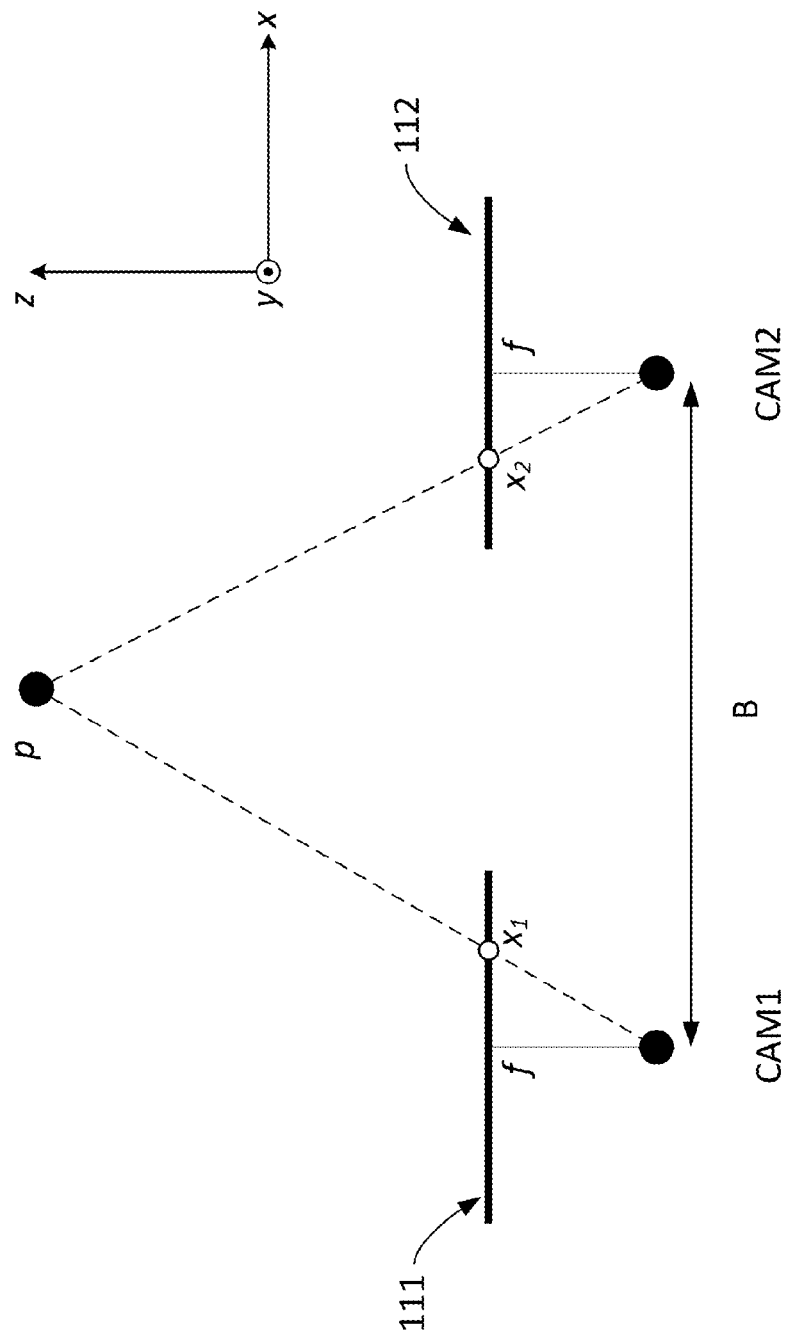
FIG. 5A is a schematic illustration of a pin-hole model of a pair of cameras after rectification.

FIG. 5A is a schematic illustration of a pin-hole model of a pair of cameras after rectification. The below discussion briefly reviews the computation of an epipolar line in a calibrated stereo camera system. This is described in more detail in, for example, Hartley and Zisserman, "Multiple View Geometry in Computer Vision, Second Edition" Cambridge University Press (2004).

As shown in FIG. 5A, cameras CAM1 and CAM2 having focal length f are spaced apart by distance B. The cameras image a scene that includes point p, which is located some distance from the cameras along the z direction. Point p is projected onto the image sensor or image plane 111 of CAM1 at location $x_1$ and projected onto the image sensor or image plane 112 of CAM2 at location $x_2$. In the case of a pair of cameras, intrinsic and extrinsic calibration parameters can be fined as follows:

$$K_1 = K_2 = K = \begin{bmatrix} f & 0 & c_x \\ 0 & f & c_y \\ 0 & 0 & 1 \end{bmatrix}$$

$$R_1 = R_2 = I_3 = \begin{bmatrix} 1 & 0 & 0 \\ 0 & 1 & 0 \\ 0 & 0 & 1 \end{bmatrix}$$

$$T_1 = \begin{bmatrix} 0 \\ 0 \\ 0 \end{bmatrix}, T_2 = \begin{bmatrix} -B \\ 0 \\ 0 \end{bmatrix}$$

Where K refers to the camera intrinsic parameters defining f (focal length), $c_x$ and $c_y$ (offsets between the center of lens and the center of the image plane) all measured in pixels, R refers to the rotations of the cameras (here, the identity matrix I because the cameras are not rotated), and T refers to the translation of the cameras with respect to the master camera (here, first camera CAM1 is considered to be the master camera and therefore it is not translated, while second camera CAM2 is translated by a distance B away from CAM1 along the x direction). These calibration parameters may be determined during the calibration process described above, where an assembled depth perceptive camera system is placed in known conditions. The fundamental matrix F for this case with calibrated and rectified stereo pair is:

$$F = [K_1 \, T_2]_\times K_2 R_2 K_1^{-1} = [K \, T_2]_\times = \begin{bmatrix} 0 & 0 & 0 \\ 0 & 0 & -Bf \\ 0 & Bf & 0 \end{bmatrix}$$

Given a point p in three dimensional space:

$$p = \begin{bmatrix} x_p \\ y_p \\ z_p \\ 1 \end{bmatrix}$$

the projection of point p onto the two cameras at locations $x_1$ and $x_2$ is given by:

$$x_1 = K[R \mid T_1]p = \begin{bmatrix} f\frac{x_p}{z_p} + c_x \\ f\frac{y_p}{z_p} + c_y \\ 1 \end{bmatrix}$$

$$x_2 = K[R \mid T_2]p = \begin{bmatrix} f\frac{x_p - B}{z_p} + c_x \\ f\frac{y_p}{z_p} + c_y \\ 1 \end{bmatrix}$$

Given the fundamental matrix F it is possible to compute the equation of the epipolar line $l_{12}$ on CAM2 from the observation of a point $x_1$ on camera 1:

$$l_{12} = Fx_1 = \begin{bmatrix} 0 \\ -1 \\ f\frac{y_p}{z_p} + c_y \end{bmatrix}$$

This is the equation of a horizontal line passing with vertical shift corresponding to the y coordinate of $x_2$, which thus lies on the epipolar line.

Figure 5B:
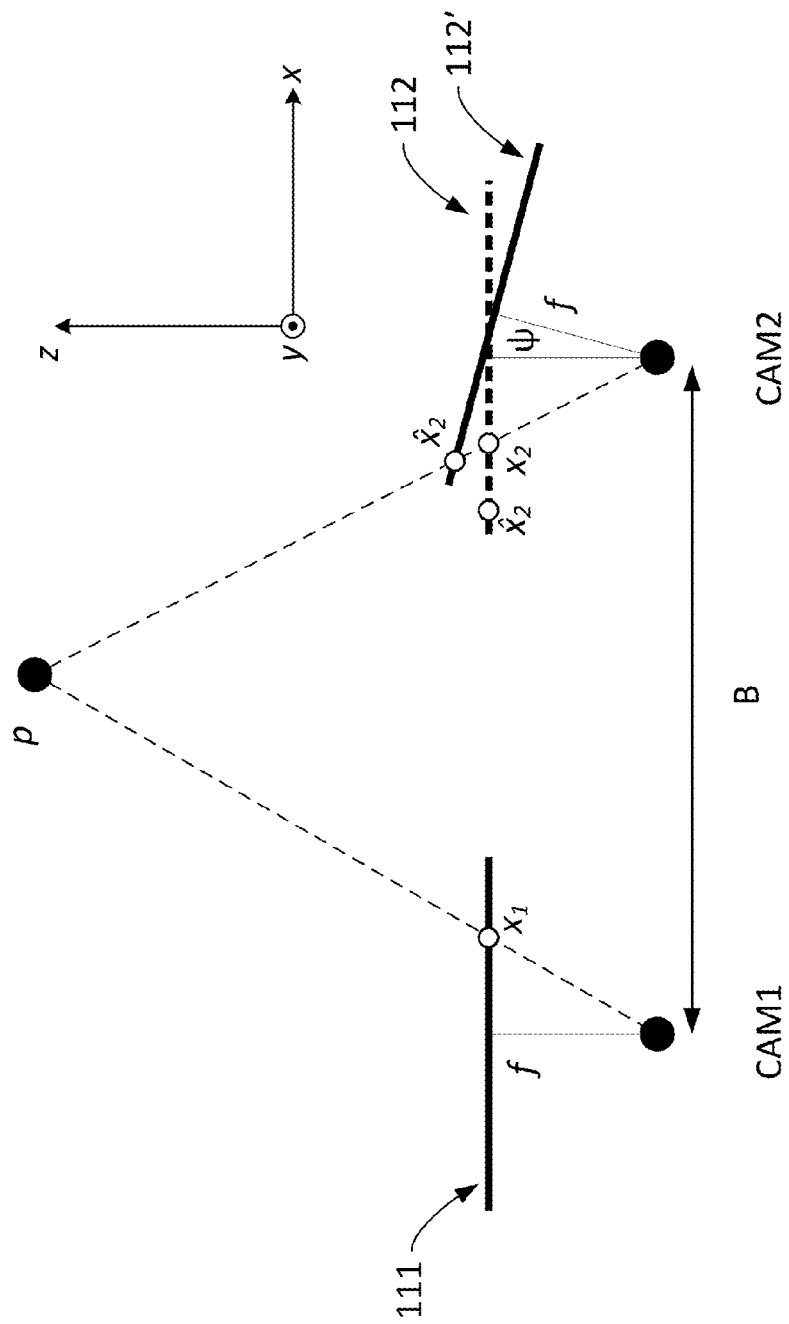
FIG. 5B is a schematic illustration of a pin-hole model of a pair of cameras after rectification and after one of the cameras has undergone a rotation.

FIG. 5B is a schematic illustration of a pin-hole model of a pair of cameras after rectification and after one of the cameras has undergone a rotation. In the below discussion, without loss of generality, it will be assumed that the focal plane of only one of the cameras (e.g., the second camera CAM2) has undergone a decalibration rotation, while the baseline (e.g., the distance between cameras CAM1 and CAM2) has not changed and the angle of the focal plane of the other camera or cameras (e.g., the first camera CAM1) has not changed. In addition, it is assumed that the depth camera system is capable of computing the location of the projection of a point p in the field of view of the cameras onto the cameras of the system (referred to as the conjugate image points x of the point p in space) based on the calibration parameters for the system prior to decalibration of the system.

Aspects of embodiments of the present invention are directed to systems and methods for determining, based on an analysis of one or more matching image points (e.g., conjugate image points x in captured images corresponding to a feature at a point p), that the depth camera system has lost calibration (or become decalibrated or has gone out of calibration). Generally speaking, decalibration can be detected when measured image points lie away from the conjugate epipolar lines on which they are expected to be found. A decalibration event that changed the location of a conjugate image point x without moving it off of the epipolar line that it was expected to appear on could still generate a plausible, but incorrect, determination of the depth of objects in the scene.

As shown in FIG. 5B, CAM2 is rotated by $\psi$ degrees and, as a result, point p is projected onto the image plane or image sensor 112' at a new location $\hat{x}_2$, which is different from its location $x_2$ before the rotation (as shown by image sensor 112). This difference would cause the depth camera system to erroneously calculate point p as having a greater depth (e.g., being farther away) than it actually is due to the increased disparity between $x_1$ and $\hat{x}_2$ than the correct disparity between $x_1$ and $x_2$. More formally, one of the cameras has undergone a rotation of $R(\psi)$:

$$R(\psi) = \begin{bmatrix} \cos(\psi) & 0 & \sin(\psi) \\ 0 & 1 & 0 \\ -\sin(\psi) & 0 & \cos(\psi) \end{bmatrix}$$

and $\hat{x}_2$ can be expressed as:

$$\hat{x}_2 = KR(\psi)[R \mid T_2]p = \begin{bmatrix} f\frac{(x_p - B)\cos(\psi) + z_p\sin(\psi)}{-(x_p - B)\sin(\psi) + z_p\cos(\psi)} + c_x \\ f\frac{y_p}{-(x_p - B)\sin(\psi) + z_p\cos(\psi)} + c_x \\ 1 \end{bmatrix}$$

Figure 5C:
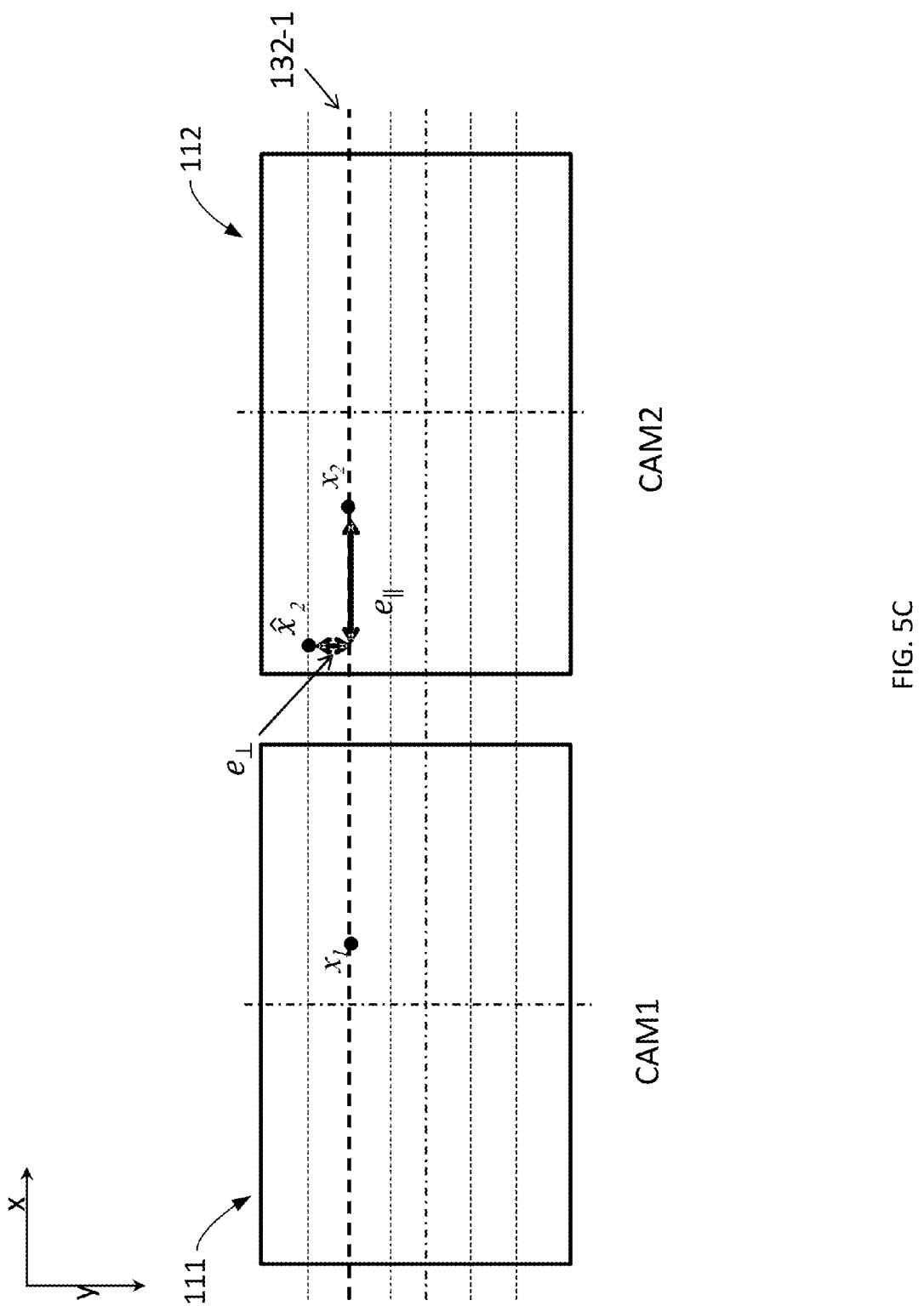
FIG. 5C schematically illustrates the location $x_1$ of a feature in an output image of the first camera and the locations $x_2$ and $\hat{x}_2$ of the feature in an output image of a second camera, respectively before and after undergoing a deformation that causes a decalibration.

FIG. 5C schematically illustrates the location of $x_1$ in an output image of the first camera CAM1 and the location of $x_2$ and $\hat{x}_2$ in an output image of a second camera CAM2, before and after undergoing a deformation, respectively. As shown in FIG. 5C, location $x_1$ corresponds to the projection of point p onto an image sensor 111 of CAM1. Location $x_1$ of the image of CAM1 is along epipolar line 132-1 and thus, when camera CAM1 and camera CAM2 are in calibration, the projection of point p onto the image sensor 112 of CAM2 at location $x_2$ is also on epipolar line 506.

However, as shown in FIG. 5C, after CAM2 has undergone a deformation, point p is projected onto location $\hat{x}_2$. The vector between $\hat{x}_2$ and $x_2$ will be referred to as "error" e (e.g., $e=\hat{x}_2-x_2$), which can be decomposed into a component $e_\parallel$ parallel to the epipolar line 506 and a component $e_\perp$ orthogonal to the epipolar line 506 (or "off-epipolar") (e.g., $e=e_\perp+e_\parallel$).

Generally, parallel errors $e_\parallel$ are substantially undetectable, because the image of the feature at point p at location $x_2$ in the second image is generally reasonable or plausible anywhere along the epipolar line corresponding to the location of $x_1$ in the first image, while off-epipolar errors $e_\perp$ are more easily detectable.

In a two camera system, some types of rotations, such as the rotation of a camera along an axis parallel to the baseline, or a rotation having a significant component along an axis parallel to the baseline, can cause a significant off-epipolar error $e_\perp$ which is desirable because the error can be easily detected and reported or corrected.

On the other hand, parallel or "on-epipolar" errors $e_\parallel$ may be undetectable and a decalibration event may also be detectable if $e_\perp$ is large enough to be observed. For example, a pure rotation around the y axis (e.g., along a direction perpendicular to the epipolar lines), may result in substantially no error along a direction perpendicular to the epipolar line $e_\perp$. These types of errors are realistic, such as in the context of the bending of a mounting board along a line perpendicular to the baseline between the cameras.

As shown in the analysis herein, in a two-camera system, if decalibration is due to a rotation of a camera along an axis perpendicular to the baseline between the two cameras, then the off-epipolar error $e_\perp$ is, in general, much smaller than the in-epipolar error $e_\parallel$ (e.g., $e_\perp \ll e_\parallel$). Therefore, under this type of decalibration event, it would be difficult to discover that the stereo system became decalibrated on the basis of conjugate image point pairs. What is needed, therefore, is a camera system where a decalibration condition produces a large $e_\perp$ error which is more readily detectable.

As such, embodiments of the present invention are directed to a depth camera system capable of detecting the most common and larger variety of decalibration scenarios, where the depth camera system includes at least three non-collinear cameras.

Figure 6:
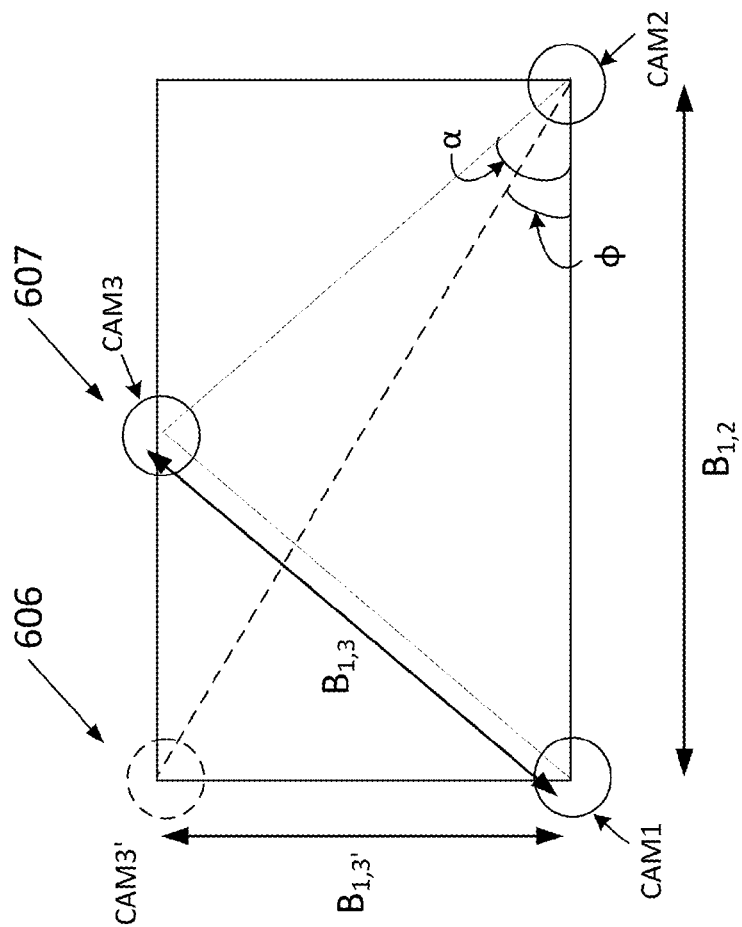
FIG. 6 illustrates two different embodiments of the present invention with different arrangements of three non-collinear cameras.

FIG. 6 illustrates two different embodiments of the present invention with different arrangements of three non-collinear cameras, where two of the cameras are spaced apart by a baseline distance B. As shown in FIG. 6, in one embodiment, a third camera CAM3 is at location 607 that is offset from a midpoint along an axis between the first two cameras CAM1 and CAM2 so that the three cameras form an isosceles triangle, where the two equal angles of the isosceles triangle are denoted as α (and the third angle is 180°−2α in degrees). In another embodiment of the present invention, a third camera CAM3' is at location 606, which is "directly above" one of the cameras (CAM1), in other words, a baseline $B_{1,3}$ between CAM1 and CAM3' is perpendicular to a baseline $B_{1,2}$ between CAM1 and CAM2 so that the three cameras form a right triangle where the angle between CAM3', CAM2, and CAM1 is denoted φ. However, embodiments of the present invention are not limited to these. For example, CAM3 may be located "directly above" CAM2, or may be located at any position between. For example, the three cameras CAM1, CAM2, and CAM3 may form an irregular triangle. The motivation for placing the third camera in position CAM3 is to increase out of calibration detectability, and the motivation for placing the third camera in position CAM3' is to reduce occlusion (as shown in FIG. 3) between CAM1 and the third camera with some compromise in decalibration detectability as will be explained below.

The three cameras shown in FIG. 6 have substantially overlapping fields of view (FOV) or a common field of view. For example, all three cameras may be oriented in substantially the same direction to image a scene and the optical axes of the three cameras CAM1, CAM2, and CAM3, may be substantially parallel.

Figure 7:
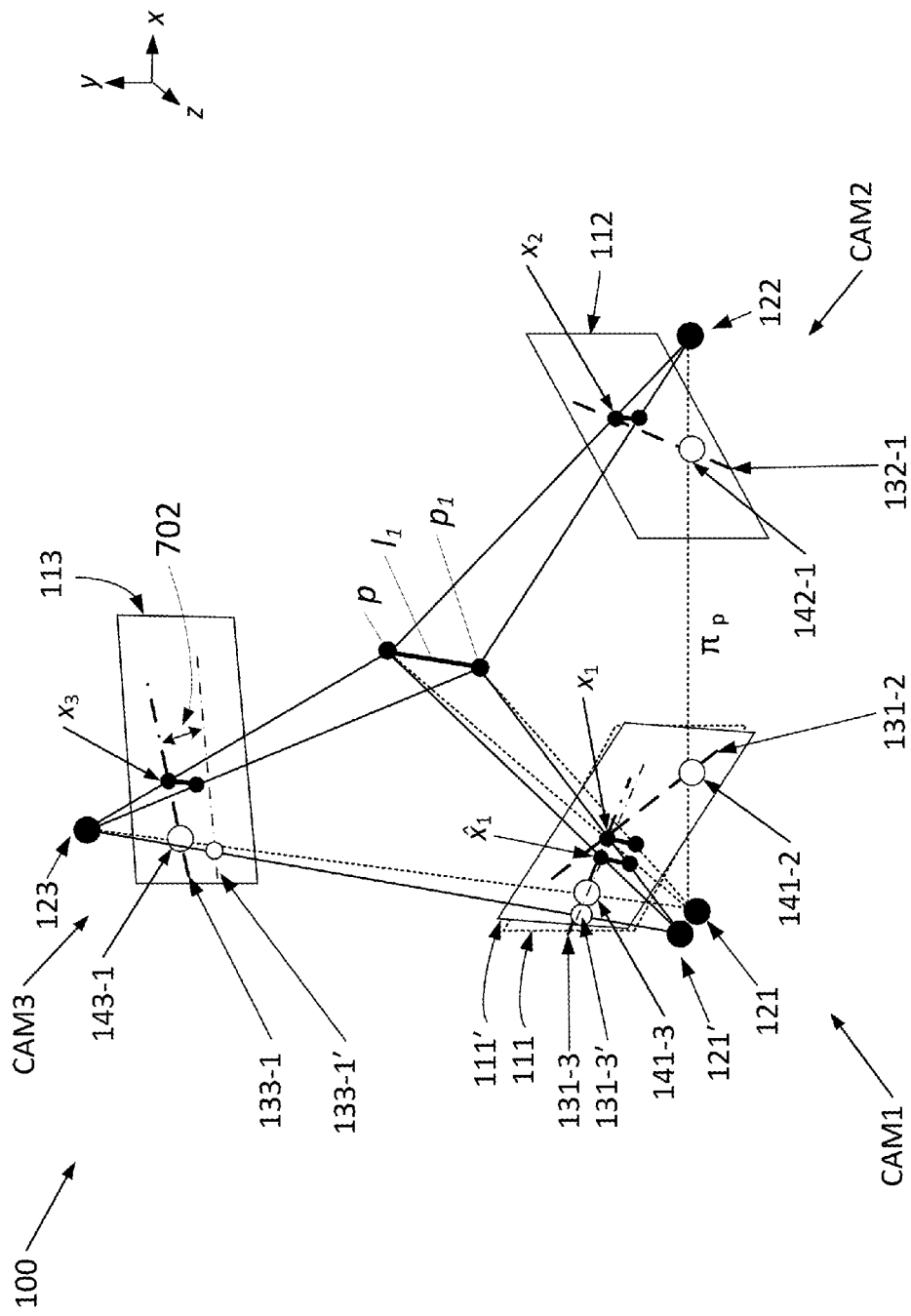
FIG. 7 illustrates a trinocular camera system according to one embodiment of the present invention in which one of the cameras is decalibrated.

FIG. 7 illustrates a trinocular camera system according to one embodiment of the present invention in which one of the cameras is decalibrated. FIG. 7 is substantially similar to FIG. 1 and, as such, descriptions of portions that are the same will not be repeated herein. Referring to FIG. 7, CAM1 is shown as having undergone a decalibration in which camera center 121 has shifted to new location 121' and image plane 111 (shown in dotted lines) has rotated to a new position 111' (shown in solid lines). As a result, point p is now projected onto location $\hat{x}_1$. The decalibration has also shifted the location of conjugate epipolar line 131-3 to 131-3' and conjugate epipolar line 133-1 to 133-1'. While the decalibration had little to no effect on conjugate epipolar line 132-1, the shift or error 702 in epipolar line 133-1 to 133-1' caused by the decalibration is large and detectable, as will be discussed in more detail below.

A depth camera system having at least three cameras according to embodiments of the present invention provides several advantages, such as the ability to compute depth by reasoning from disparity from all camera pairs in the system (e.g., the three camera pairs CAM1-CAM2, CAM1-CAM3, and CAM2-CAM3 in a trinocular system), and also the possibility of adding a color camera to a grayscale or infrared stereo pair, thereby providing color information to a reconstructed three-dimensional scene.

In one embodiment of the present invention including three cameras, two of the cameras are used to compute disparity (and thereby the depth) of various points in the scene, while the third camera is used to capture color information. Each of the three camera pairs defines an epipolar geometry, represented in terms of a plurality of conjugate epipolar lines. In more detail, each location or pixel of each of the image planes 111, 112, and 113 can be projected onto a corresponding conjugate epipolar line of the other image planes. For example, as shown in FIGS. 1 and 7, location or pixel at location $x_1$ of the first image plane 111 can be projected onto epipolar line 132-1 of the second image plane 112 (for the camera pair CAM1-CAM2) and can also be projected onto conjugate epipolar line 133-1 of the third image plane 113 (for the camera pair CAM1-CAM3). Similarly, location $x_2$ of the second image plane 112 can be projected onto epipolar line 131-2 of the first image plane 111 and can also be projected onto a conjugate epipolar line of the third image plane 113. Likewise, location $x_3$ of the third image plane 113 can be projected onto epipolar line 131-3 of the first image plane 111 and can also be projected onto a conjugate epipolar line of the second image plane 112.

Figure 8:
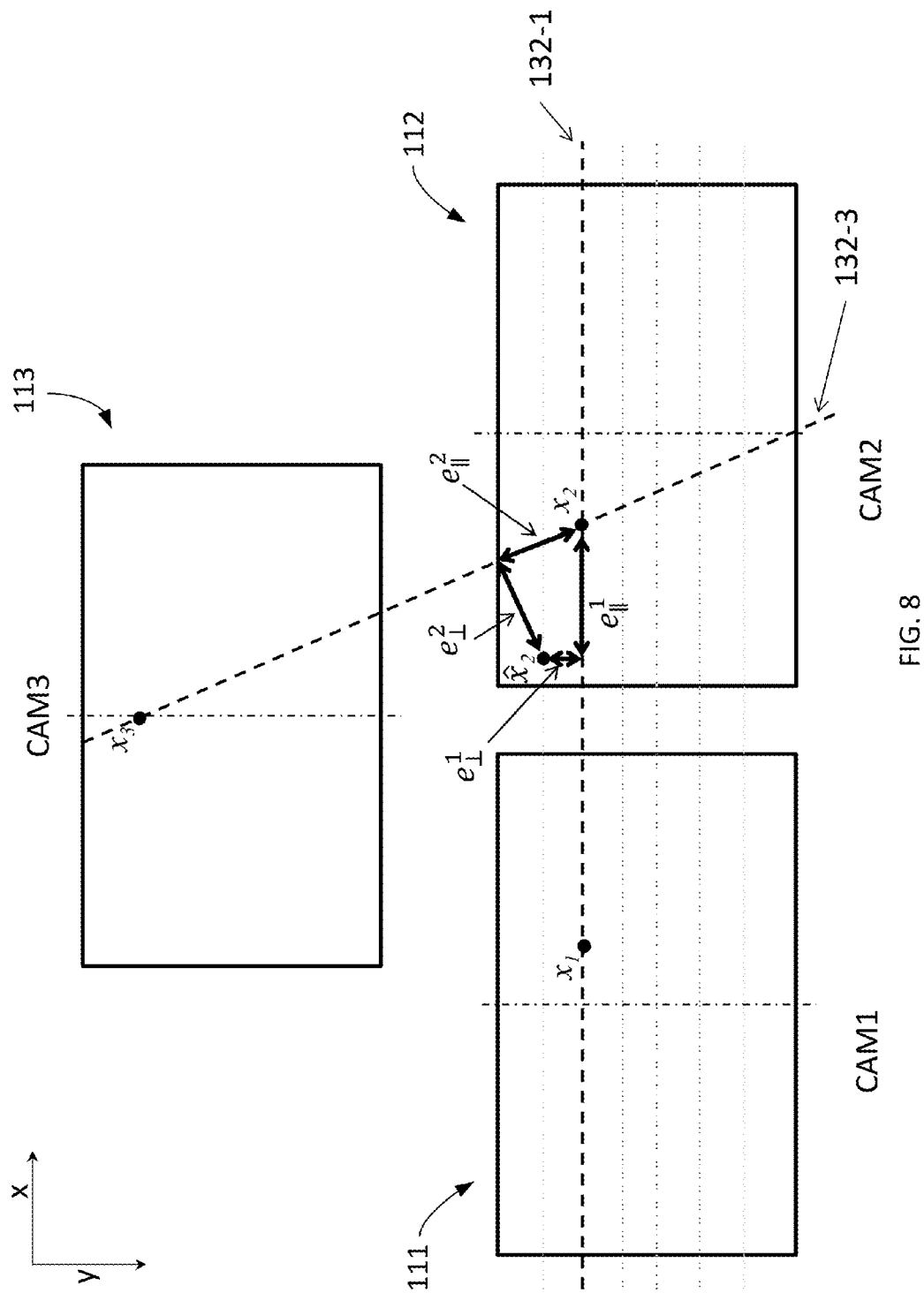
FIG. 8 is a schematic diagram illustrating a depth perceptive camera system according to one embodiment of the present invention.

FIG. 8 is a planar schematic diagram illustrating a three camera system according to one embodiment of the present invention including CAM1, CAM2, and CAM3. A point p in a scene is imaged and projected onto the image planes of CAM1, CAM2, and CAM3 at $x_1$, $x_2$, and $x_3$, respectively. The differences in the locations of pairs (e.g., $x_1$–$x_2$ or $x_1$–$x_3$ or $x_2$–$x_3$) corresponds to the disparities. If the second camera CAM2 undergoes a decalibration (e.g., a rotation) while the rest of the system remains the same, then the same point p of the scene is now projected onto location $\hat{x}_2$. As discussed above with respect to FIG. 5C, the distance between $\hat{x}_2$ and $x_2$ is referred to as the error e.

The above discussion regarding FIG. 5C noted that the error e can be represented as two components: an in-epipolar component $e_{\parallel}$ which is parallel to the epipolar line 132-1 (between the first and second cameras CAM1 and CAM2) and an off-epipolar component $e_{\perp}$ which is perpendicular or orthogonal to the epipolar line 132-1 such that $e=e_{\parallel}+e_{\perp}$.

In FIG. 5C, only two cameras CAM1 and CAM2 were considered, and the off-epipolar component of the error $e_{\perp}$ was smaller than the in-epipolar component of the error $e_{\parallel}$ (e.g., because the change in orientation of CAM2 was dominated by a rotation along the axis perpendicular to the epipolar line 132-1). In some circumstances, the off-epipolar component of the error $e_{\perp}$ may not have been large enough to be detectable.

However, the situation is changed with the arrangement in FIG. 8, which adds a third camera CAM3. The first error $e^1$ when compared against the epipolar line 132-1 between CAM1 and CAM2 remains the same, where $e^1=e_{\parallel}^1+e_{\perp}^1$ and $e_{\perp}^1$ may still be relatively small. (The operator + here is a vector addition.) However, in this circumstance, the epipolar line 132-3 between CAM3 and CAM2 may also be used to determine the magnitude of the second error $e^2$ (i.e. e superscript 2 and not e to the power of 2) where $e^2=e_{\parallel}^2+e_{\perp}^2$. (The operator + here is a vector addition.) As seen in FIG. 8, $e_{\perp}^2$ is significantly larger than $e_{\perp}^1$ and therefore may be large enough to allow detection of the decalibration of the second camera CAM2, whereas $e_{\perp}^1$ may have been too small to detect. This difference in the magnitude of the off-epipolar error arises because the third camera CAM3 is non-collinear with the other two cameras CAM1 and CAM2, which causes its epipolar lines with the two cameras, such as epipolar line 132-3, to be non-parallel with (or have a component orthogonal to) the epipolar lines between the other two cameras (e.g., epipolar line 132-1 between CAM1 and CAM2).

As such, with proper layout of the at least three cameras of the depth perceptive camera system, a decalibration event due to rotation of the cameras results in noticeable off-epipolar errors for at least one of the camera pairs in the system. This is because the amount of off-polar epipolar error depends on the direction of the rotation axis of the camera that became decalibrated. When this axis is orthogonal to the baseline of one camera pair and parallel to the focal plane of the first camera in the pair, small off-epipolar error $e_{\perp}$ for that camera pair should be expected. However, the geometry shows that this situation cannot occur in all camera pairs simultaneously, and thus at least one camera pair will have noticeable off-epipolar error $e_{\perp}$.

Therefore, embodiments of the present invention allow the detection of decalibration events even when they could not have been discovered by a binocular camera system. In the case of a trinocular camera system, a layout of the three cameras in an equilateral triangle maximizes the sum of the magnitudes of the off-epipolar errors across camera pairs divided by the magnitude of the in-epipolar error.

Figure 9A:
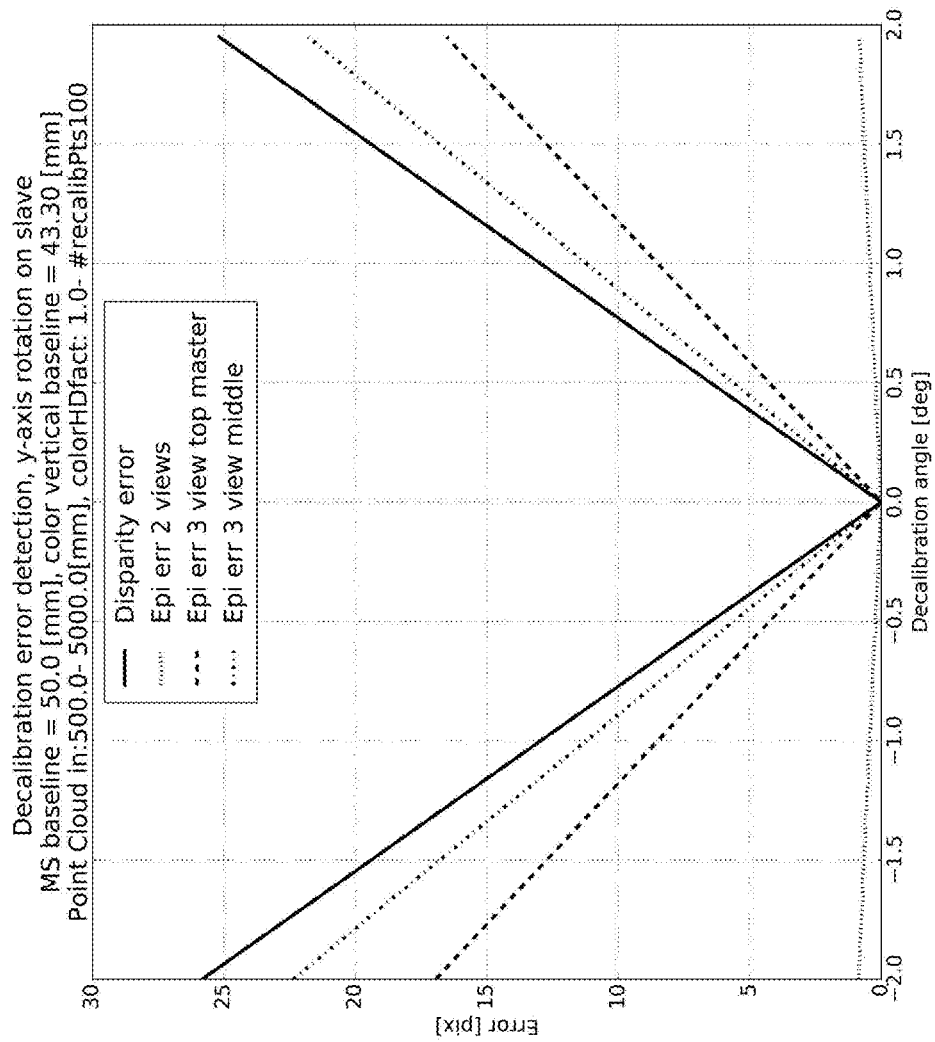
FIGS. 9A and 9B are graphs illustrating the results from an analysis of disparity error as a function of the angle $\psi$ by which one camera is decalibrated or rotated about the y-axis.
Figure 9B:
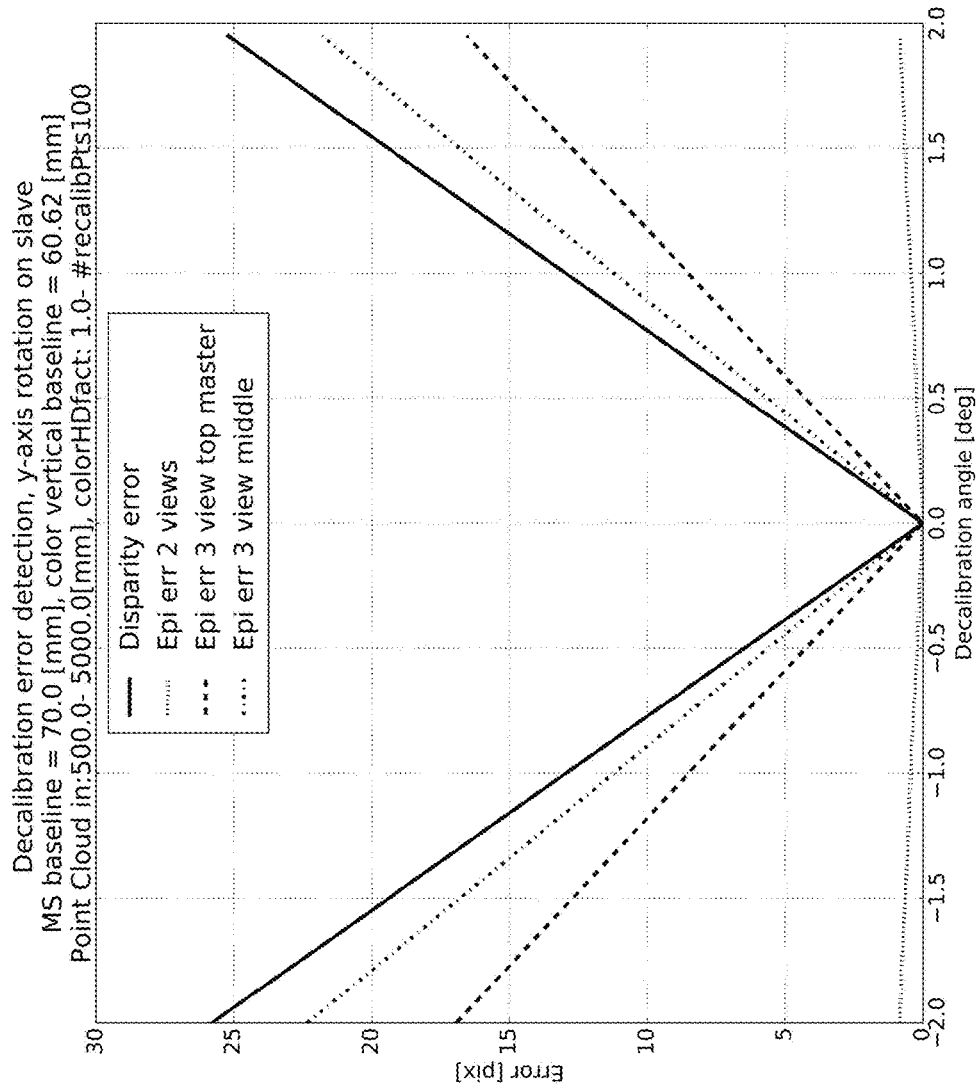

FIGS. 9A and 9B are graphs that illustrate the results from an analysis of disparity error as a function of the angle ψ by which one camera is decalibrated or rotated about the y-axis (referred to as disparity error in the figures). In particular, FIGS. 9A and 9B illustrate actual disparity error, in other words, the distance in pixels along the direction of the epipolar line between the expected location x of a feature if the system had not undergone decalibration and its actual detected location $\hat{x}$ after decalibration.

FIGS. 9A and 9B also illustrate the results of analyzing the above model of epipolar error (e.g., $e_{\perp}$) in multiple scenarios. In particular, the detected epipolar error is shown for a two camera system (referred to in FIGS. 9A and 9B as "Epi err 2 views") where the baseline between the two cameras extends along the x-axis, which is perpendicular to the y-axis about which one of the cameras rotates. Also shown in FIGS. 9A and 9B is the detected epipolar error for a three camera system arranged with one camera directly above one of the baseline cameras (e.g., arranged as a right triangle, as shown in FIG. 6 and the third camera CAM3' in position 606, referred to in FIGS. 9A and 9B as "Epi err 3 view top master"), and a three camera system with one camera arranged above a midpoint between the other two cameras (e.g., arranged as an isosceles triangle, as shown in FIG. 6 with the third camera CAM3 at position 607, referred to in FIGS. 9A and 9B as "Epi err 3 view middle").

FIG. 9A shows the results from the analysis of a model system where a baseline between two of the cameras (e.g., CAM1 and CAM2 which, in the model, are assumed to be infrared cameras) is 50.0 mm, the distance between the baseline and the third camera (e.g., CAM3 which, in the model, is assumed to be a color camera) is 43.3 mm at position 607. The horizontal axis of the graph represents the angle by which the slave camera (e.g., CAM2) is rotated around the y-axis (e.g., an axis perpendicular to the baseline and parallel to the line between the baseline and the third camera CAM3), and the vertical axis represents the error in pixels. The graphs include the disparity error, denoted by the solid line, which is the distance projected along the epipolar line between the expected location x of the feature and the actual location $\hat{x}$ of the feature after decalibration (e.g., $|x-\hat{x}|$), and the epipolar error for different arrangements, denoted by the various dotted lines, where the epipolar error is the projection of the distance perpendicular to the epipolar line between the expected location x of the feature and the actual location $\hat{x}$ of the feature after decalibration (e.g., $|x-\hat{x}|$). The model assumes a 3D point cloud at distances in the range of 500.0-5000.0 mm covering the field of view of the cameras. The "color resolution factor" ("colorHDfact" in FIG. 9) refers to the ratio of the vertical resolution of the color camera CAM3 with respect to the vertical resolution of the infrared cameras CAM1 and CAM2, which is assumed to be 1.0 in the model (e.g., that the three cameras CAM1, CAM2, and CAM3 have the same resolution). As would be expected, when the slave camera or second camera CAM2 is not rotated (at zero degrees), then there is no disparity error (e.g., zero pixels). The disparity error increases as the decalibration angle increases—under these particular conditions, the disparity error increases linearly with decalibration angle and, as shown in FIG. 2, an error of more than twenty-five pixels is expected with a decalibration of two degrees or negative two degrees. It should be appreciated that a decalibration of two degrees is a significant deformation of the camera system geometry, as a typical camera may have a field of view in the range of 30 degrees to 60 degrees, so a 2 degree change may change 1/30th to 1/15th of what is in the field of view.

However, in the two camera arrangement, e.g., with only first camera CAM1 and second camera CAM2, even if the slave camera CAM2 is rotated by as much as two degrees, thereby resulting in an actual disparity error of more than twenty-five pixels, the off-epipolar error $e_\perp$ may be very small, as shown by the curve "Epi err 2 views," which only increases to one pixel at a two degree decalibration. In other words, for decalibrating of a camera due to a rotation of less than two degrees around the y-axis, it may be difficult to detect errors when searching for corresponding features because the decalibration may shift the feature by less than one pixel in an off-epipolar direction, even though the feature was shifted by more than twenty-five pixels along the on-epipolar direction.

Adding a third camera CAM3 that is non-collinear with the other cameras, in accordance with some embodiments of the present invention, significantly changes this. As seen in FIG. 9A, when a third camera is placed 43.3 mm off the baseline extending between the other two cameras and directly above the master camera (e.g., CAM1), the rotation of CAM2 is detectable as an off-epipolar error $e_\perp$ between the third camera CAM3 and the slave or second camera CAM2, as shown in the curve labeled "Epi err 3 view top master." For example, a rotation of the slave or second camera CAM2 around the y-axis by 0.5 degrees causes an off-epipolar error of about four pixels, which can be detected by the system. In contrast, in a two camera system, a rotation of 0.5 degrees would cause less than one pixel of off-epipolar error, which is unlikely to be detectable.

In some embodiments, the third camera CAM3 is located above a midpoint of the baseline between the other cameras. In these embodiments, the increase the size of the epipolar error for a given decalibration angle, as shown by the curve labeled "Epi err 3 view middle." However, embodiments of the present invention are not limited thereto.

FIG. 9B is substantially similar to FIG. 9A, but changes the scale of the baseline between two of the cameras from 50.0 mm to 70.0 mm. In addition, in the analysis shown in FIG. 9B, the vertical distance between the baseline and the third camera is increased to 60.62 mm. As seen in FIG. 9B, the curves of the disparity error, the "Epi err 2 views," "Epi err 3 view top master," and "Epi err 3 view middle" are substantially the same as in FIG. 9A, where the off-epipolar error in a two camera arrangement may be less than one pixel for decalibration events of less than about two degrees, and where a third, non-collinear camera may significantly increase the size of the off-epipolar error.

The data presented in FIG. 9A an FIG. 9B shows that the analysis method is applicable for the spatial layout of a wide range of multi-camera systems that are housed in different devices mentioned before.

Method for Detecting Decalibration

Figure 10:
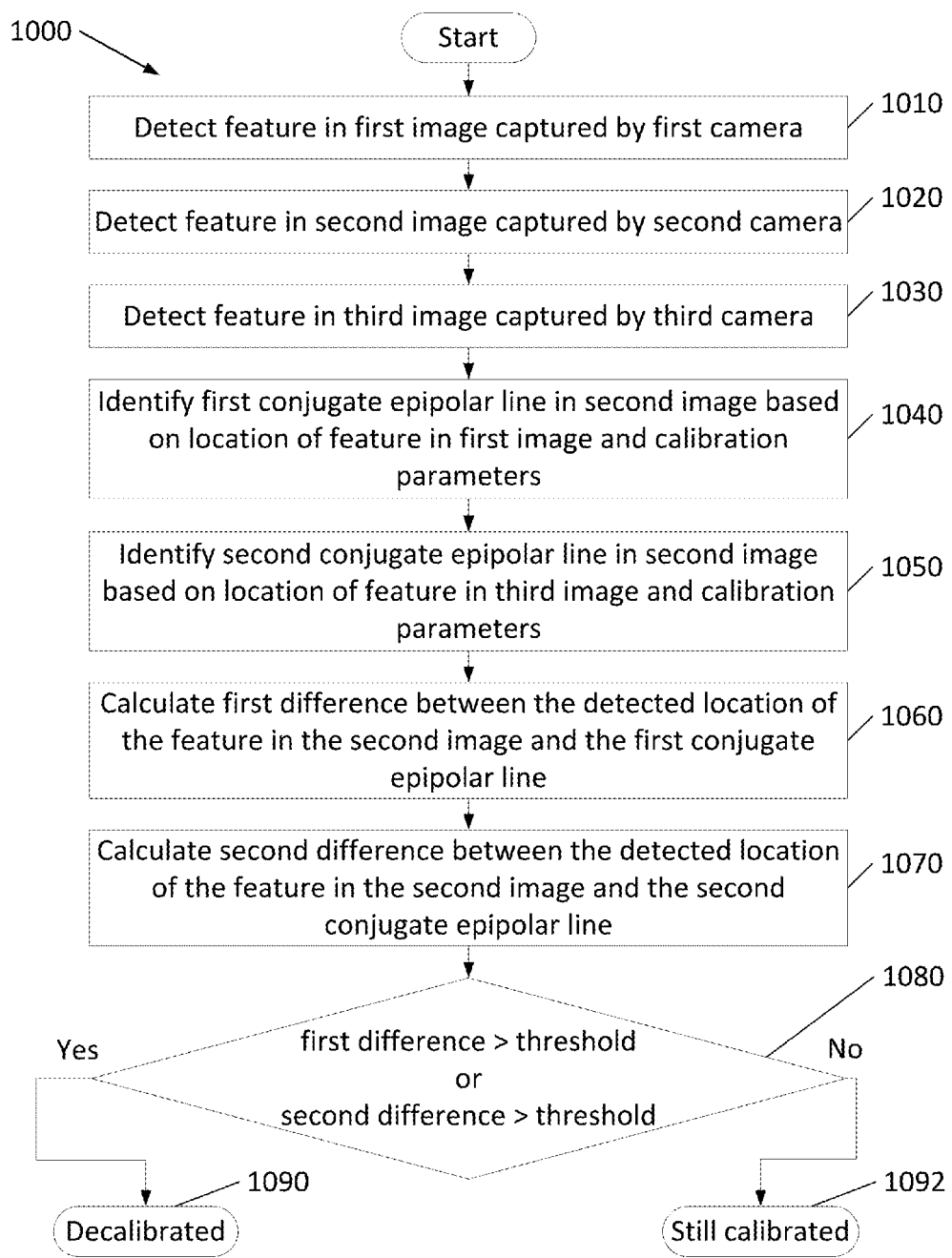
FIG. 10 is a flowchart illustrating a method for detecting a decalibration event according to one embodiment of the present invention.

FIG. 10 is a flowchart of a method for detecting a decalibration event in a depth camera system including at least three non-collinear cameras according to one embodiment of the present invention. Referring to FIG. 10, a method 1000 for detecting a decalibration of a depth camera system includes detecting a feature (e.g., a feature at point p in a scene viewable by the three cameras) in a first image captured by a first camera 1010, in a second image captured by a second camera 1020, and in a third image captured by a third camera 1030 substantially at the same time (e.g., in synchrony). Referring to FIG. 8, the feature at point p may appear at locations $x_1$, $x_2$, and $x_3$, respectively.

In operation 1040, a first conjugate epipolar line in the second image is identified based on calibration parameters and the location of the feature in the first image (e.g., as shown in FIG. 8, first conjugate epipolar line 132-1 is identified based on the location of $x_1$ in image plane 111 of first camera CAM1). In operation 1050, a second conjugate epipolar line in the second image is identified based on the calibration parameters and the location of the feature in the third image (e.g., as shown in FIG. 8, second conjugate epipolar line 132-3 is identified based on the location of $x_3$ in image plane 113 of third camera CAM3). The identification of the conjugate epipolar lines may include, for example, calculating a line location based on the detected feature point of the other image and the calibration parameters, where the parameters were measured during a calibration process.

In operation 1060, a first difference between the detected location of the feature in the second image (e.g., $\hat{x}_2$ in FIG. 8) and the first conjugate epipolar line (e.g., epipolar line 132-1 in FIG. 8) is calculated (e.g., this difference may correspond to the off-epipolar error $e_\perp^1$ shown in FIG. 8). Similarly, in operation 1070, a second difference between the detected location of the feature in the second image (again, $\hat{x}_2$ in FIG. 8) and the second conjugate epipolar line (e.g., epipolar line 132-3 in FIG. 8) is calculated (e.g., this difference may correspond to the off-epipolar error $e_\perp^2$ shown in FIG. 8).

In operation 1080, the first difference is compared to a threshold value and the second difference is compared to a threshold value. The threshold values of the first and second differences may be the same or different. If at least one of the differences is greater than a threshold value, then the depth camera system 100 detects that the cameras have become decalibrated in operation 1090. However, if both of the differences are below the threshold (e.g., zero), then the depth camera system 100 detects that the system is still calibrated in operation 1092.

Such thresholds values are in pixels and can be set according to the camera resolution, the expected noise in the feature detection and matching operation, and the amount of calibration error that one likes to detect.

In other embodiments of the present invention, decalibration may be detected based on an expected location of a feature in an image. For example, after identifying the first conjugate epipolar line and the second conjugate epipolar line in operations 1040 and 1050, an expected location of the feature $x_2$ may be calculated based on a location of an intersection of the first conjugate epipolar line and the second conjugate epipolar line. A difference between the expected location $x_2$ and the detected location $\hat{x}_2$ can then be calculated and, the system may determine that the cameras have become decalibrated in response to determining that this difference exceeds a threshold.

Therefore, embodiments of the present invention are capable of detecting decalibration of a depth camera system including three non-collinear cameras.

Spatial Layout of Cameras in Depth Camera System

In embodiments of the present invention, a third, color camera (e.g., denoted by CAM3) in an offset position with respect to axis of a pair of depth sensing cameras (denoted by CAM1 and CAM2), allows capturing fused color and depth information of the scene substantially at the same time, while also enabling detection when any of the cameras goes out of calibration with respect to the rest of the system (e.g., with respect to the other two cameras).

As seen in the above discussion with respect to FIG. 6, there is a wide range of spatial configurations of the three cameras. For example, in a first configuration in which the third camera CAM3 is located at a position 607 above a midpoint of a baseline between the first and second cameras CAM1 and CAM2, the angle between the baseline and the line between the third camera CAM3 and the first or second camera may be denoted as α. In another configuration, the third camera CAM3 may be located at position 606, where the third camera is located directly above one of the other cameras, so that the line between the third camera and the first camera is perpendicular to the baseline between the first camera and the second camera, and the line between the second camera and the third camera forms an angle φ.

Analysis shows that the sum of the magnitudes of off-epipolar errors across camera pairs divided by the magnitude of the in-epipolar error is maximized when the three cameras are equidistant from each other (e.g., in an equilateral triangle).

On the other hand, as discussed above, occlusion is reduced when the cameras are placed closer together.

As such, decalibration detection capability and occlusion reduction may be both considered in deciding the arrangement of the non-collinear cameras of the system. The tradeoff between occlusion and de-calibration detectability (and/or having highest possible common field of views) can produce a variety of camera placements based on assigning different weights given each optimization factor. In addition, good, but non-optimal arrangements are also included in embodiments of the present invention, such as solutions that provide 90% or 95% of the benefit of the optimal solution, based on other design constraints such as the placement of a display device between the cameras.

Referring to FIG. 6, two of the cameras are spaced apart from each other by a baseline distance B. In one embodiment, these two cameras are infrared cameras and are used for performing depth calculations. As such, the baseline is one of the factors governing the precision of the depth data as a function of distance of the target to the cameras. In particular, the depth precision is given by the formula:

$$\Delta z = \frac{z^2}{fB}$$

where Δz is the precision or statistical error in estimating depth, z is the distance to the target, f is the focal length of the two cameras, and B is the baseline or distance between the two cameras. In the modeled systems of FIGS. 9A and 9B, the baselines were 50 mm and 70 mm, respectively, but embodiments of the present invention are not limited thereto.

If two cameras CAM1 and CAM2 in a rectified stereo pair, separated by baseline $B_{1,2}$, observe an object at distance $Z_F$ in the foreground against a background (e.g., a wall) at distance $Z_B$, then the image at each camera includes a region of occluded background pixels (that is, of pixels that are the projection of points from the background that are seen in one camera but not in the other). The area of the occluded (see FIG. 3) region in each image is a function $g(Z_F, Z_B, f)$ of the distances of the foreground object $Z_F$ and the background $Z_B$, as well as of the focal length f, multiplied by the baseline $B_{1,2}$ (for sake of convenience, the two cameras are assumed to the same focal length f).

Similarly, there is an occlusion calculated with respect to a third camera CAM3 with focal length of f in a trinocular system. For example, when considering occlusion between the third camera CAM3 and the image captured by the first camera CAM1, the amount of occlusion measured on the image will be equal to the same function $g(Z_F, Z_B, f)$ multiplied by the new baseline $B_{1,3}$ (e.g., the distance between the first camera CAM1 and the third camera CAM3). The ratio between these two occlusion areas (occlusion between CAM1 and CAM2, and occlusion between CAM1 and CAM3) is thus equal to $B_{1,3}/B_{1,2}$ because the functions g are the same.

In one embodiment of the present invention, the first and second cameras CAM1 and CAM2 are separated by a baseline distance $B_{1,2}$, which may be chosen based on considerations such as the size of the physical device that will house the camera system, such as a mobile phone, a tablet, or a laptop computer. On the other hand, the placement of the third camera CAM3 (e.g., a color camera) can be chosen to adjust the parameter $B_{1,3}$ in the above occlusion ratio $B_{1,3}/B_{1,2}$.

FIGS. 11A, 11B, 11C, and 11D are graphs illustrating the results from an analysis of occlusion and epipolar error detection in depth camera systems including at least three cameras according to embodiments of the present invention. Two of the cameras of the depth camera system are arranged along a baseline at a fixed distance. The third camera is spaced apart from the baseline and the horizontal axis of the graphs is the distance of the third camera from the baseline. The vertical axis of the graphs represents a performance metric, referred to on the graphs as a "ratio."

In one embodiment, the epipolar detection performance metric is the sum of the magnitude of all off-epipolar errors, each divided by the magnitude of in-epipolar error (see the curve labeled "detected epi error"), and the occlusion performance metric is the ratio $B_{1,3}/B_{1,2}$ (see the curve labeled "vertical/horizontal occlusion"). As such, in one embodiment, the performance metric considering both off-epipolar error detection and occlusion is difference between these performance metrics, as shown in the curve labeled "det err—occlusion" in FIGS. 11A and 11B.

Figure 11A:
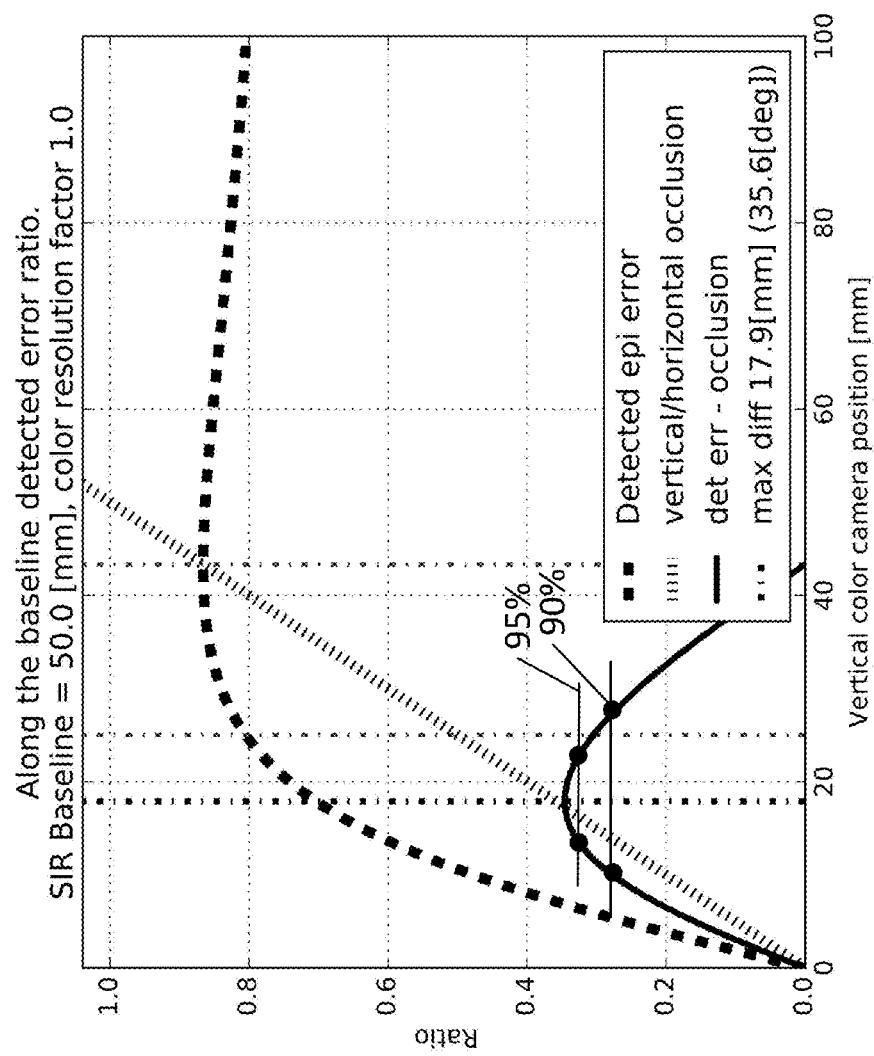
FIGS. 11A, 11B, and 11C are graphs illustrating the results from an analysis of occlusion and epipolar error detection in depth camera systems including at least three cameras according to embodiments of the present invention.

FIG. 11A is a graph illustrating an analysis of a depth camera system with three cameras, where two of the cameras are arranged along a baseline of length 50 mm. As shown in FIG. 11A, and as discussed above, the "detected epi error" line has a peak when the three cameras are arranged in an equilateral triangle, e.g., when the third camera is at a distance of about 43.3 mm from the baseline. The occlusion metric "vertical/horizontal occlusion" is minimized when the distance between the third camera and the other cameras is minimized (in other words, when the three cameras are collinear), but this also causes the "detected epi error" metric to be minimized, which is undesirable. As such, the difference between the two performance metrics, shown as "det err—occlusion" is also shown in FIG. 11. This curve has a peak at about 17.9 mm, which corresponds to an angle α (as shown in FIG. 6) of about 35.6 degrees.

Figure 11B:
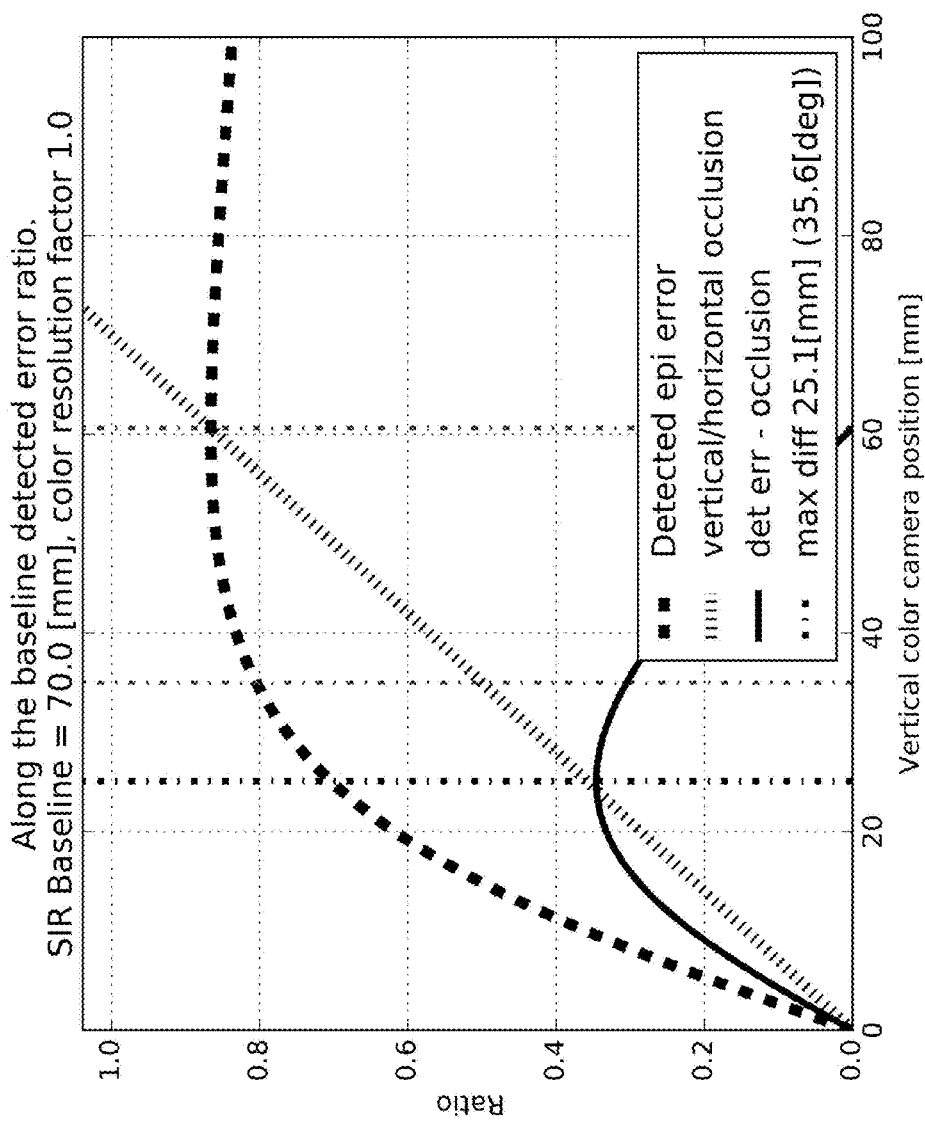

FIG. 11B is a graph illustrating an analysis of a depth camera system with three cameras, where two of the cameras are arranged along a baseline of length 70 mm. FIG. 11B is substantially similar to FIG. 11A and, while the distances are scaled due to the large baseline (e.g., by geometry, the peak of "detected epi error" is at about 60.6 mm and the peak of "det err—occlusion" is at about 25.1 mm), the angle α corresponding to the peak of the performance metric accounting for both increasing or maximizing off-epipolar detection and reducing or minimizing occlusion ("det err—occlusion") still has a peak at about 35.6 degrees.

While an angle α of about 35.6 degrees is optimal for some arrangements of a camera system according to embodiments of the present invention, embodiments of the present invention are not limited thereto and also encompasses ranges of angles α where the "det err—occlusion"

metric is within good performance ranges (e.g., greater than 75% of the value of the peak at about 35.6 degrees). For the said percentiles, the range of the angle α and vertical baseline can be estimated as follows: at 75%, α is in the range of about 19.8 to about 48.9 degrees and the vertical baseline is in the range of 9.0 to 28.7 mm; at 80%, α is in the range of about 21.6 to about 47.6 degrees and the vertical baseline is in the range of 9.9 to 27.4 mm; at 85%, α is in the range of about 23.7 to about 46.1 degrees and the vertical baseline is in the range of 11.0 to 26.0 mm; at 90%, α is in the range of about 26 to about 44.3 degrees and the vertical baseline is in the range of 12.2 to 24.4 mm, correspondingly; at 95%, α is in the range of 28.9 to 41.9 degrees and the vertical baseline is in the range of 13.8 to 22.4 mm, correspondingly. The 90 and 95 horizontal percentile lines shown in FIG. 11A are for the illustration purposes and are not to scale.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

For example, while some embodiments of the present invention are described above with respect to a depth perceptive trinocular (or three-camera) system, embodiments of the present invention are not limited thereto and may be applied to depth perceptive systems having four or more cameras. The process of calculating an arrangement of the cameras may be based on a weighted average of occlusion and decalibration costs among all of the cameras in the system.

Figure 11C:
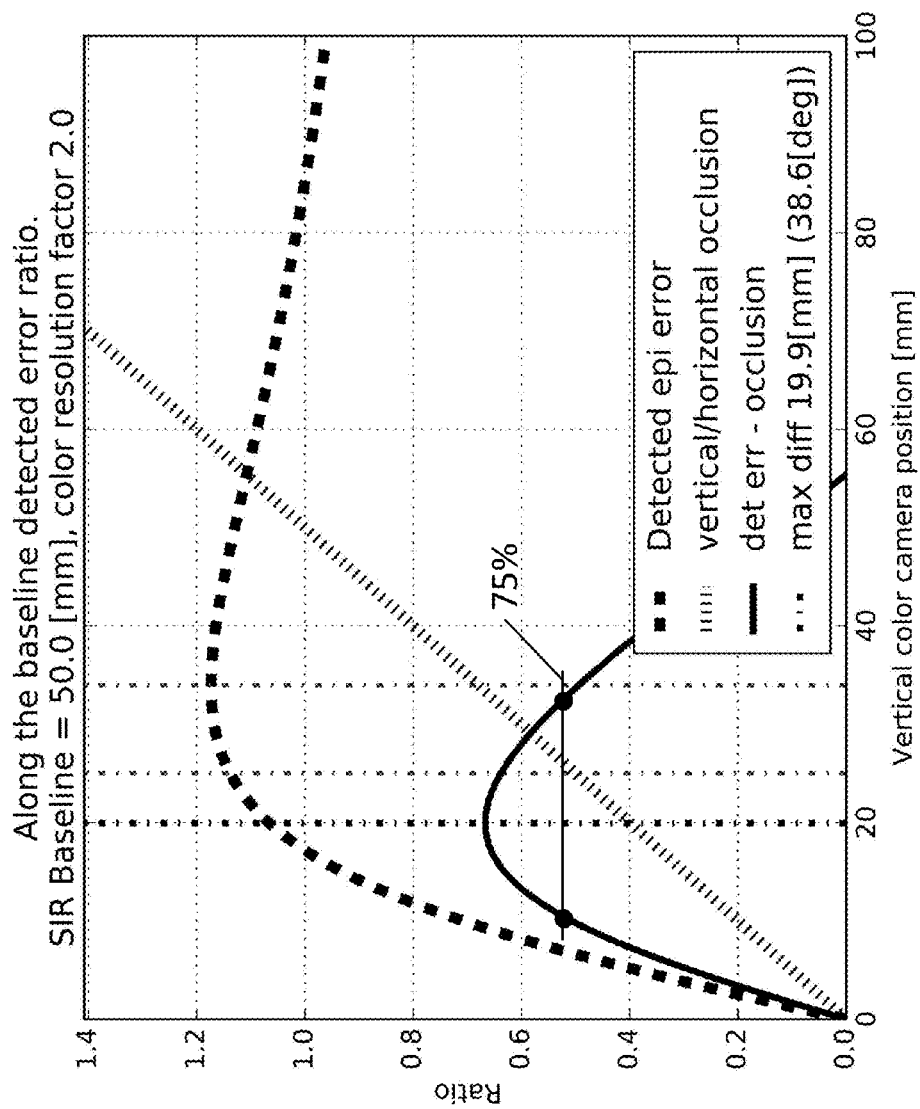
Figure 11D:
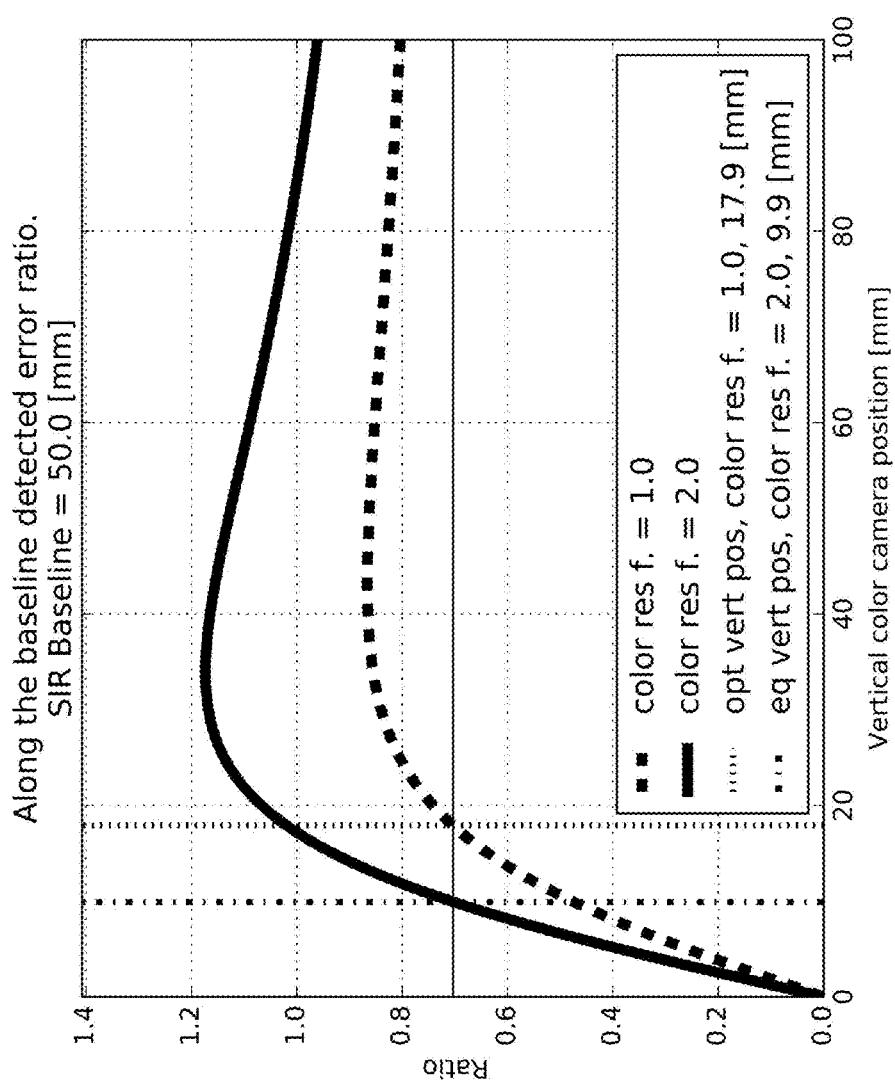
FIG. 11D is a graph illustrating an analysis of a depth camera system according to one embodiment of the present invention with three cameras, where two of the cameras are arranged along a baseline of length 50 mm, and where one of the cameras has a higher resolution than the other two cameras.

FIGS. 11C and 11D are graphs illustrating an analysis of a depth camera system according to one embodiment of the present invention with three cameras, where two of the cameras are arranged along a baseline of length 50 mm, and where one of the cameras has a higher resolution than the other two cameras. In the above discussion, for the sake of convenience, the cameras were assumed to have the same resolution. However, in practice, color cameras generally have much higher resolution (e.g., in the range of multiple megapixels) than infrared cameras (e.g., the cameras used for depth calculation). FIGS. 11C and 11D illustrate that the methodology presented herein also applies to a trinocular system with cameras of different resolutions and substantially the same field of view. Specifically, in FIGS. 11C and 11D, the third camera (e.g., CAM3) is assumed to have a resolution factor (also referred to herein, in some embodiments, as 'color resolution factor') of 2.0 indicating a camera with twice the resolution in both the vertical and horizontal dimensions, and therefore a total of 2×2=4 times the resolution of the other baseline cameras (e.g., CAM1 and CAM2). For example, if CAM1 and CAM2 both have resolutions of 640 pixels by 480 pixels and CAM3 has a resolution of 1280 by 960 pixels, then the resolution factor is 2.0 (e.g., 1280 pixels/640 pixels=2.0 and 960 pixels/480 pixels=2.0). While the term "color resolution factor" is used herein to suggest indicate a color camera has higher resolution than the other cameras (e.g., non-color cameras), embodiments of the present invention are not limited thereto and the camera having a higher resolution is not required to be a color camera and not required to capture a different portion of the spectrum than the lower resolution cameras. For example, all three cameras may be color or visible light cameras, all three cameras may be infrared cameras, or various combinations thereof, and any of these cameras may have a higher resolution than the others.

FIG. 11C is thus similar to FIG. 11A having the same 50 mm baseline, but with different third camera resolution. FIG. 11D compares epipolar error for a case of the third camera having "color resolution factor"=1.0 (same as FIG. 11A, and captioned "color res f.=1.0") and a case of the third camera having "color resolution factor"=2.0 (same as FIG. 11C, and captioned "color res f.=2.0"), as function of vertical position of the third camera in mm (as shown along the x-axis of FIG. 11D) with respect to the baseline or axis between the other two cameras. In this embodiment, a higher resolution third camera (e.g., CAM3) enables the third camera to come closer to the baseline axis of the other two cameras (e.g., CAM1 and CAM2), with a color resolution factor of 2.0, from 17.9 mm to 9.9 mm, while maintaining the same detectability error of the embodiment of FIG. 11A (with color resolution factor of 1.0). This is shown in the figure by tracing a horizontal line from the optimal vertical position of 17.9 mm (shown by the dotted vertical line labeled "opt vert pos, color res f.=1.0, 17.9 [mm]" in FIG. 11D) for the 'color resolution factor' 1.0 curve to the color resolution factor 2.0 curve to find a corresponding part of the color resolution factor 2.0 curve having the same performance and identifying that this intersection corresponds to a vertical position of 9.9 mm (as shown by the dotted line labeled "eq vert pos, color res f.=2.0, 9.9 [mm]" in FIG. 11D) where in the angle formed between the vertical and horizontal baselines is 21.6 degrees. As illustrated in FIG. 3, by reducing the baseline distance between two cameras, the undesirable occlusion effect is also reduced. Thus the embodiment described with respect to FIG. 11D maintains the same error detection capability as the embodiment where the color resolution factor is 1.0, while reducing the occlusion effect. FIG. 11C also illustrates one embodiment of the present invention in which a range of angles α where the "det err—occlusion" metric is within 75% of the value of the peak at about 38.6 degrees. For the said percentile, the angle α is in the range of about 21.4 degrees to about 53.4 degrees and the vertical baseline (given a horizontal baseline of 50.0 mm) is in the range of about 9.8 mm to about 33.7 mm. Similar ranges can be calculated for other embodiments. In one embodiment where the "det err—occlusion" metric is within 80% of the value of the peak, the range of angle α is in the range of about 23.4 degrees to about 51.9 degrees (e.g., a vertical baseline in the range of about 10.8 to about 31.9 mm). In one embodiment where the "det err—occlusion" metric is within 85% of the value of the peak, the range of angle α is in the range of about 25.5 degrees to about 50.3 degrees (e.g., a vertical baseline in the range of about 11.9 to about 30.1 mm). In one embodiment where the "det err—occlusion" metric is within 90% of the value of the peak, the range of angle α is in the range of about 28.0 degrees to about 48.2 degrees (e.g., a vertical baseline in the range of about 13.3 to about 28.0 mm). In one embodiment where the "det err—occlusion" metric is within 95% of the value of the peak, the range of angle α is in the range of about 31.3 degrees to about 45.5 degrees (e.g., a vertical baseline in the range of about 15.2 to about 25.4 mm).

FIGS. 11A, 11B, 11C, and 11D depict some exemplary embodiments of the present invention. For example, FIG. 11A, depicts an analysis of a system having a color resolution factor of 1.0 and FIG. 11C depicts an analysis of a system having a color resolution factor of 2.0, but embodiments of the present invention are not limited thereto and embodiments of the present invention also encompass systems having different color resolution factors. Analytically, the optimal angle α, for out of calibration detectability and reducing occlusion, between the vertical and horizontal baselines of the present invention can be expressed as:

$$\alpha_{optimal} = \operatorname{argmax}_\alpha\left\{\left(\frac{2\times\sin(\alpha)+r\times\sin(2\alpha)}{3}\right)-\left(\frac{\tan(\alpha)}{2}\right)\right\}$$

where $\frac{\tan(\alpha)}{2} = \frac{\text{vertical\_baseline}}{\text{horizontal\_baseline}}$, r is resolution factor and argmax$_\alpha$\{expression\} is a known function that finds the value of α that maximizes the expression. In addition, as discussed above, ranges of angles α around the optimal angle $\alpha_{optimal}$ can be calculated in which performance is close to optimal (e.g., ranges of angles providing at least 75%, at least 90%, or at least 95% of the performance at the optimal angle $\alpha_{optimal}$).

What is claimed is:

1. A depth perceptive camera system comprising:
   a first camera configured to capture infrared images;
   a second camera;
   a third camera arranged non-collinearly with the first and second cameras, the first, second, and third cameras having substantially overlapping fields of view in a direction, and at least one of the second and third cameras being configured to capture visible light images, the third camera being equidistant from the first and second cameras, the third camera having a higher resolution than a resolution of the first camera by a resolution factor r; and
   an image signal processor configured to receive images from the first camera, the second camera, and the third camera, the image signal processor being configured to detect a decalibration of the first, second, and third cameras,
   wherein a first baseline extends between the second camera and the first camera,
   wherein a second baseline extends between the second camera and the third camera, and
   wherein an angle α formed between the first baseline and the second baseline is approximately $\alpha_{optimal}$, where $$\alpha_{optimal} = \operatorname{argmax}_\alpha\left\{\left(\frac{2\times\sin(\alpha)+r\times\sin(2\alpha)}{3}\right)-\left(\frac{\tan(\alpha)}{2}\right)\right\}.$$

2. The depth perceptive camera system of claim 1, wherein the resolution factor r is 1.0, and
   wherein the angle α is in the range of 26.0 degrees to 44.3 degrees.

3. The depth perceptive camera system of claim 2, wherein the angle α is in the range of 28.9 degrees to 41.9 degrees.

4. The depth camera system of claim 3, wherein the angle α is about 35.6 degrees.

5. The depth perceptive camera system of claim 1, wherein the resolution factor r is 2.0, and
   wherein the angle α is in the range of 21.4 degrees to 53.4 degrees.

6. The depth perceptive camera system of claim 1, wherein the first camera and the second camera are configured to capture invisible light, and
   wherein the third camera is configured to capture visible light.

7. The depth perceptive camera system of claim 1, further comprising a projection device located between the first camera and the second camera, the projection device being configured to emit a textured pattern of invisible light in the direction of the overlapping fields of view.

8. The depth perceptive camera system of claim 1, wherein the image signal processor is configured to detect the decalibration of the first, second, and third cameras by:
   detecting a feature in a first image captured by the first camera;
   detecting the feature in a second image captured by the second camera;
   detecting the feature in a third image captured by the third camera, the third camera being non-collinear with the first and second cameras;
   identifying a first conjugate epipolar line in the second image in accordance with a detected location of the feature in the first image and a plurality of calibration parameters;
   identifying a second conjugate epipolar line in the second image in accordance with a detected location of the feature in the third image and the plurality of calibration parameters;
   calculating a difference between a detected location of the feature in the second image and the first and second conjugate epipolar lines; and
   outputting an indication that the depth camera system is decalibrated in response to the difference exceeding a threshold.

9. The depth perceptive camera system of claim 8, wherein the difference comprises a first difference and a second difference, and
   wherein the image signal processor is configured to calculate the difference by:
   calculating a first difference between the detected location of the feature in the second image and the first conjugate epipolar line; and
   calculating a second difference between the detected location of the feature in the second image and the second conjugate epipolar line.

10. The depth perceptive camera system of claim 8, wherein the image signal processor is further configured to:
    calculate a location of an intersection of the first conjugate epipolar line and the second conjugate epipolar line; and
    calculate the difference by calculating a distance between the detected location of the feature in the second image and the location of the intersection.

11. A mobile device comprising:
    a display;
    a first camera configured to capture infrared images, the first camera being adjacent a first edge of the display;
    a second camera adjacent the first edge of the display;
    a third camera arranged non-collinearly with the first and second cameras and adjacent a second edge of the display, the first, second, and third cameras having substantially overlapping fields of view, and at least one of the second and third cameras being configured to capture visible light images, the third camera being equidistant from the first and second cameras, the third camera having a higher resolution than a resolution of the first camera by a resolution factor r; and
    an image signal processor configured to control the display and to receive images from the first camera, the second camera, and the third camera, the image signal processor being configured to detect a decalibration of the first, second, and third cameras, wherein a first baseline extends between the second camera and the first camera, wherein a second baseline extends between the second camera and the third camera, and wherein an angle α formed between the first baseline and the second baseline is approximately $\alpha_{optimal}$, where $$\alpha_{optimal} = \mathrm{argmax}_\alpha \left\{ \left( \frac{2 \times \sin(\alpha) + r \times \sin(2\alpha)}{3} \right) - \left( \frac{\tan(\alpha)}{2} \right) \right\}.$$

12. The mobile device of claim 11, wherein the resolution factor r is 1.0, and
wherein the angle α is in the range of 26.0 degrees to 44.3 degrees.

13. The mobile device of claim 12, wherein the angle α is in the range of 28.9 degrees to 41.9 degrees.

14. The mobile device of claim 11, wherein the resolution factor r is 2.0, and
wherein the angle α is in the range of 21.4 degrees to 53.4 degrees.

15. The mobile device of claim 11, wherein the image signal processor is configured to detect the decalibration of the first, second, and third cameras by:

detecting a feature in a first image captured by the first camera;

detecting the feature in a second image captured by the second camera;

detecting the feature in a third image captured by the third camera, the third camera being non-collinear with the first and second cameras;

identifying a first conjugate epipolar line in the second image in accordance with a detected location of the feature in the first image and a plurality of calibration parameters;

identifying a second conjugate epipolar line in the second image in accordance with a detected location of the feature in the third image and the plurality of calibration parameters;

calculating a difference between a detected location of the feature in the second image and the first and second conjugate epipolar lines; and outputting an indication that the first, second, and third cameras are decalibrated in response to the difference exceeding a threshold.

* * * * *